(12) United States Patent
Koh et al.

(10) Patent No.: US 7,682,753 B2
(45) Date of Patent: Mar. 23, 2010

(54) SOLID ELECTROLYTE COMPRISING FLUORINE-CONTAINING POLYMER HAVING FLUORINE-CONTAINING ETHER CHAINS

(75) Inventors: Meiten Koh, Settsu (JP); Takayuki Araki, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1391 days.

(21) Appl. No.: 11/096,056

(22) Filed: Apr. 1, 2005

(65) Prior Publication Data

US 2005/0170255 A1 Aug. 4, 2005

Related U.S. Application Data

(63) Continuation-in-part of application No. PCT/JP03/12631, filed on Oct. 2, 2003.

(30) Foreign Application Priority Data

Oct. 3, 2002 (JP) .............................. 2002-290720

(51) Int. Cl.
*H01M 10/40* (2006.01)
(52) U.S. Cl. ....................... 429/316; 252/62.2; 361/525
(58) Field of Classification Search ................ 429/316, 429/304, 306, 324, 331; 252/62.2; 361/525
See application file for complete search history.

(56) References Cited

FOREIGN PATENT DOCUMENTS

| CN | 1220029 A | | 6/1999 |
|----|-----------|---|--------|
| EP | 1167397 A1 | * | 1/2002 |
| JP | 5-178949 | | 7/1993 |
| JP | 08-222270 | * | 8/1996 |
| JP | 8-222270 | | 8/1996 |
| JP | 11-502543 | | 3/1999 |
| JP | 11-329062 | | 11/1999 |
| JP | 2002-198093 | | 7/2002 |
| JP | 2002-203604 | | 7/2002 |
| WO | WO 97/44842 | | 11/1997 |

\* cited by examiner

*Primary Examiner*—Patrick Ryan
*Assistant Examiner*—Monique Wills
(74) *Attorney, Agent, or Firm*—Sughrue Mion, PLLC

(57) ABSTRACT

There is provided a fluorine-containing polymer solid electrolyte which has an excellent ion-conducting property, is high in oxidation resistance, is stable electrochemically and thermally, has sufficient strength and is applicable to various electrochemical devices. The electrolyte comprises (A) a non-crystalline fluorine-containing polymer having, in a trunk chain and/or side chain of the polymer molecule, a structural unit D having five or more chained units derived from a fluorine-containing ether, (B) an electrolytic compound and (C) a solvent, and has an ionic conductivity of from $10^{-10}$ to $10^1$ S/cm measured at 25° C. by an alternating current complex impedance method. The electrolyte is useful for various electrochemical devices.

20 Claims, No Drawings

SOLID ELECTROLYTE COMPRISING FLUORINE-CONTAINING POLYMER HAVING FLUORINE-CONTAINING ETHER CHAINS

CROSS-REFERENCE TO RELATED APPLICATION

This is a continuation-in-part of PCT international application No. PCT/JP03/12631 filed on Oct. 2, 2003, incorporated herein by reference.

BACKGROUND OF THE INVENTION

The present invention relates to a fluorine-containing polymer solid electrolyte which comprises a non-crystalline fluorine-containing polymer having, in its trunk chain and/or side chain, structural units derived from a specific fluorine-containing ether, an electrolytic compound and as case demands, a solvent The fluorine-containing polymer solid electrolyte is useful as an electrolyte for electrochemical devices, particularly various batteries, capacitors, solid display devices and sensors.

So far ion conductors in the form of solution or paste have been used as an electrolyte for electrochemical devices such as batteries, capacitors and sensors from the viewpoint of good ion-conducting property. However electrolytes of such forms have problems with safety such as damage of devices due to leakage of solution and occurrence of fire. Also since there arises scattering of solution at a sealing part of a housing case of a device, a high technique for sealing is required, and further a separator for impregnation of an electrolytic solution is necessary. It is therefore pointed out that there is a limit in downsizing of devices and making devices thin.

On the other hand, there are proposed solid electrolytes of inorganic crystalline substances, inorganic glass, organic polymeric substances and the like. Represented examples of an inorganic material are ceramics such as $\beta$-$Al_2O_3$. However since those ceramics exhibit ion-conducting property only at high temperatures of not less than 300° C., they cannot be applied to batteries used at ordinary temperature, and applications thereof are limited. Also ceramics are very fragile and have disadvantages that breaking occurs when assembling or using devices and molding thereof is difficult, and therefore ceramics are not practicable.

Organic polymeric substances are generally excellent in processability and moldability, and obtained solid electrolytes have flexibility and processability in bending. Therefore a degree of freedom in device design is increased, and development thereof is expected. At present, there is available a complex of polyethylene oxide (PEO) and inorganic salt as a represented organic solid polymer having ion-conducting property, which however, has low ion-conducting property when an electrolytic solution is not contained therein, and is not practicable. Therefore an amorphous polypropylene oxide (PPO) and a PEO derivative having an oligoethylene oxide chain in its side chain are studied, but ion-conducting property thereof is still insufficient (for example, JP8-113496A, JP8-173435A, JP8-183186A, etc.).

Also there is a trial of enhancing ion-conducting property by adding, to a PEO/inorganic salt complex, a proper amount of plasticizer such as an organic solvent. However since the mixture has flowability and cannot maintain a solid state, there are disadvantages that assembling work of device becomes difficult, fire arises more easily and strength is low.

Heretofore polymers having anionic functional group such as —$SO_3$— or —COO— at an end of a side chain thereof have been primarily studied as an ion-conducting material of fluorine-containing polymeric substance. Those fluorine-containing polymers act as a polymer anion and functions as a single ion conductor for conduction of a cation only. Therefore application thereof is limited and applications mainly for an electrolyte for fuel cells and for ion exchange membrane have been studied (for example, U.S. Pat. No. 3,282,875, Journal of Power Sources, No. 29, p. 399 (1990), Journal of Electro-chemical Society, No. 135, p. 2209 (1988), etc.).

With respect to an ion-conducting material which is prepared from a fluorine-containing polymeric substance having no ionic functional group, a compound comprising polyvinylidene fluoride and electrolytic solution and a compound comprising a polyvinylidene fluoride-hexafluoropropene copolymer and electrolytic solution have been widely studied as a gel electrolyte for lithium battery (for example, Polymer Bulletin, Vol. 7, pp. 271-275 (1982), U.S. Pat. No. 5,296,318, etc.). A polymer battery comprising polyvinylidene fluoride and an electrolytic solution is electrochemically stable and has a characteristic that the polymer itself is difficult to burn since fluorine atom is contained therein, but has a disadvantage that when temperature is raised, the electrolytic solution bleeds out from the polymer. For the purpose to improve a property of holding an electrolytic solution, a polyvinylidene fluoride-hexafluoropropene copolymer is used, but since the polymer itself has no ion-conducting property, it cannot be used as a solid electrolyte, and also a large amount of electrolytic solution need be contained in order to obtain sufficient ion-conducting property as a gel electrolyte. As a result, there remain problems with safety such as damage of devices due to leakage of solution and occurrence of fire, and a high technique for sealing is required to prevent scattering of solution at a sealing part of a housing case of a device.

On the other hand, a PPO derivative obtained by converting methyl group of PPO to trifluoromethyl group has been studied mainly as an electrolyte for lithium battery (for example, JP6-103764A, JP8-217872A, JP8-222270A, JP9-48832A, etc.). However there are disadvantages that when an electrolytic solution is not contained, ion-conducting property is low, oxidation resistance and heat resistance are not sufficient and a mechanical strength is low as well as a disadvantage that when crosslinking with an acrylic crosslinking agent, electrochemical stability is not good.

The object of the present invention is to provide a solid electrolyte which has high ion-conducting property, has electrochemical and thermal stability and is safe. Another object of the present invention is to provide a fluorine-containing polymer solid electrolyte which is capable of making thin, small and light-weight electrochemical devices such as battery, capacitor and electro-chromic device.

SUMMARY OF THE INVENTION

The present inventors have made intensive studies and as a result, have found that a solid electrolyte comprising an electrolytic compound and a non-crystalline fluorine-containing polymer compound having, in its trunk chain and/or side chain, a specific structural unit derived from a fluorine-containing ether, and also the solid electrolyte further containing a solvent can have excellent ion-conducting property, high oxidation resistance, electrochemical and thermal stability and sufficient strength, and have completed the present invention.

Also the present inventors have found that those solid electrolytes are applicable to various electrochemical devices making use of the characteristics mentioned above.

Namely, the first of the present invention relates to a fluorine-containing polymer solid electrolyte which has an ionic conductivity of from $10^{-10}$ to $10^1$ S/cm measured at 25° C. by an alternating current complex impedance method and comprises:

(A) a non-crystalline fluorine-containing polymer having, in a trunk chain and/or a side chain of a polymer molecule, a structural unit derived from a fluorine-containing ether and represented by the formula (D):

$$-(d1)_{n1}-(d2)_{n2}-(d3)_{n3}-(d4)_{n4}-$$

wherein
(d1) is $-(OCF_2CF_2CF_2)-$,
(d2) is $-(OCFX^1CF_2)-$ or $-(OCF_2CFX^1)-$,
(d3) is $-(OCFX^2)-$,
(d4) is $-(OCH_2CF_2CF_2)-$ or $-(OCF_2CF_2CH_2)-$;

n1, n2, n3 and n4 are the same or different and each is 0 or an integer of 1 or more, and n1+n2+n3+n4 is an integer of from 5 to 200; $X^1$ and $X^2$ are the same or different and each is F or $CF_3$, and (B) an electrolytic compound.

The second of the present invention relates to a fluorine-containing polymer solid electrolyte which has an ionic conductivity of from $10^{-10}$ to $10^1$ S/cm measured at 25° C. by an alternating current complex impedance method and comprises:

(A) the above-mentioned non-crystalline fluorine-containing polymer,
(B) an electrolytic compound, and
(C) an organic solvent and/or water.

The non-crystalline fluorine-containing polymer (A) is roughly classified into a polymer having the structural unit D derived from a fluorine-containing ether in its trunk chain, a polymer having the structural unit D in its side chain and further a polymer having the structural units D in its trunk chain and side chain.

The third of the present invention relates to electrochemical devices produced using the above-mentioned fluorine-containing polymer solid electrolytes, such as various batteries, capacitors, solid display devices and sensors.

DETAILED DESCRIPTION

The solid electrolyte of the present invention is characterized in that the fluorine-containing polymer (A) contains the structural unit D having at least 5, particularly from 5 to 200, further preferably from 5 to 100 chained fluorine-containing ether units represented by:

(d1): $-(OCF_2CF_2CF_2)_{n1}-$,
(d2): $-(OCFX^1CF_2)_{n2}-$ or $-(OCF_2CFX^1)_{n2}-$,
(d3): $-(OCFX^2)_{n2}-$ and
(d4): $-(OCH_2CF_2CF_2)_{n4}-$ or $-(OCF_2CF_2CH_2)_{n4}-$ wherein $X^1$, $X^2$, n1, n2, n3 and n4 are as defined above. If the number of chained units is less than five, excellent ion-conducting property and thermal and electrochemical stability which are obtained by introducing the structural unit D becomes insufficient. If the number of chained units exceeds 200, not only workability when producing the solid electrolyte of the present invention but also miscibility with the electrolytic compound and solvent is lowered, which is not preferred.

Kind and combination of the units (d1), (d2), (d3) and (d4) contained in a chain of units are not limited particularly. A chain of units may comprise single units or may comprise two or more kinds of units. Preferred units are, for example, the units (d1) and (d2) but are not limited to them.

When the fluorine-containing polymer (A) having this structural unit D is used, there can be provided a solid electrolyte possessing enhanced characteristics such as ion-conducting property, heat resistance, oxidation resistance and safety as compared with conventional PEO.

Therefore if the content of structural unit D is decreased, its effect is restricted. The preferred content of structural unit D in the polymer (A) is not less than 10% by weight, desirably not less than 50% by weight. If the content is less than 10% by weight, the above-mentioned excellent characteristics become insufficient.

As mentioned above, there are non-crystalline fluorine-containing polymers (A) having the structural unit D in the polymer trunk chain, in the polymer side chain or both in the polymer trunk chain and polymer side chain.

Preferred examples of the non-crystalline fluorine-containing polymer (A) having the structural unit D in the polymer trunk chain are those represented by the following formulae (1) to (3).

(1) Non-crystalline fluorine-containing polymer represented by the formula (1):

$$(M1)-(M)-(M2) \quad (1)$$

in which the structural unit M is a fluorine-containing polyether polymer chain segment having:

$$-D-(A-D)-_{n6}$$

wherein D is said structural unit D, A is a divalent organic group having 1 to 50 carbon atoms, n6 is 0 or an integer of from 1 to 20; M1 and M2 are the same or different and each is a hydrocarbon group having 1 to 50 carbon atoms which may have ether bond or a fluorine-containing alkyl group having 1 to 50 carbon atoms.

(2) Non-crystalline fluorine-containing polymer represented by the formula (2):

$$(M3)-(M)-(M4) \quad (2)$$

in which the structural unit M is a fluorine-containing polyether polymer chain segment having:

$$-D-(A-D)-_{n6}$$

wherein D is said structural unit D, A is a divalent organic group having 1 to 50 carbon atoms, n6 is 0 or an integer of from 1 to 20; M3 and M4 are the same or different and each is a hydrocarbon group having 1 to 50 carbon atoms which may have ether bond or a fluorine-containing alkyl group having 1 to 50 carbon atoms, and at least one of M3 and M4 has functional group.

(3) Non-crystalline fluorine-containing polymer represented by the formula (3):

$$(M5)-(M)-(M6) \quad (3)$$

in which the structural unit M is a fluorine-containing polyether polymer chain segment having:

$$-D-(A-D)-_{n6}$$

wherein D is said structural unit D, A is a divalent organic group having 1 to 50 carbon atoms, n6 is 0 or an integer of from 1 to 20; M5 and M6 are the same or different and each is a hydrocarbon group having 1 to 50 carbon atoms which may have ether bond or a fluorine-containing alkyl group having 1 to 50 carbon atoms, and at least one of M5 and M6 has crosslinkable functional group.

The number average molecular weight of the non-crystalline fluorine-containing polymers (A) represented by the formulae (1) to (3) is not less than 500 and not more than 700,000, preferably not less than 500 and not more than 400,000, more preferably not less than 5,000 and not more than 400,000, further preferably not less than 10,000 and not more than 200,000.

The structural unit M (fluorine-containing polyether polymer chain segment) in those fluorine-containing polymers (A) can be obtained by various methods.

For example, when n6 is 0 (when structural unit M consists of D), the structural unit M can be obtained by known method such as ring-opening reaction of a fluorine-containing epoxy group or oxetane group, fluorination reaction or reaction of TFE with oxygen from a compound corresponding to the unit (d1), (d2), (d3) or (d4) (Modern Fluoropolymers, Chapter 24, p. 435, John Willey & Sons Ltd. (1997), Makromolecular Chemie, 86,308 (1965), Petrotech, 8,840 (1985), U.S. Pat. No. 4,760,198, EP 841160039, BP 1226566, Macromolecules, 18, 1383 (1985)). For example, a —(OCF(CF$_3$)CF$_2$)— unit (d2) is obtained by ring-opening reaction of hexafluoropropylene oxide (HFPO), a —(OCH$_2$CF$_2$CF$_2$)— unit (d4) is obtained by ring-opening reaction of tetrafluorooxetane (TFO), and a —(OCF$_2$CF$_2$)— unit (d2) and —(OCF$_2$)— unit (d3) are obtained by reaction of tetrafluoroethylene (TFE) with oxygen. Also a —(OCF$_2$CF$_2$CF$_2$)— unit (d1) is obtained by fluorination reaction of the unit (d4) and fluorination reaction of —(OCH$_2$CH$_2$CH$_2$)—. The above-mentioned ring-opening reaction is generally carried out by anion polymerization reaction, and the reaction of TFE with oxygen is carried out by photoreaction. Also when two or more kinds of units are combined, for example, HFPO and TFO may be copolymerized by anion polymerization reaction.

When n6 is 1 or more, the structural unit M may be prepared by block polymerization by reacting a compound corresponding to A which is explained hereinafter with the polyether compound obtained above. Preferred examples of A are, for instance, a glycidyl derivative, an oxetane derivative and in addition, a bi-functional alcohol and bi-functional amine compound which are capable of reacting at an end of the structural unit D and functioning as a polymer chain extending agent.

A molecular weight of those fluorine-containing polyethers is easily adjusted, and can be controlled by controlling polymerization reaction by adjusting polymerization time and kind and amount of a catalyst or by modifying methods such as cleavage of a trunk chain through irradiation of X-ray or electron beam and cleavage of a trunk chain by heating in the presence of a metal oxide. Also when the method of adjusting a molecular weight by cleavage of a trunk chain is employed, the produced end is mainly —COF group, and it is possible to easily carry out various copolymerization reactions and reactions for converting to a nonionic functional group by using this end group as a reaction starting point.

Examples of the structure of A are structural units derived from bi-functional alcohols and bi-functional amines such as:

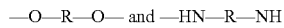

wherein R is a divalent hydrocarbon group having 1 to 50 carbon atoms which may have ether bond.

Further it is desirable that R has repeat units of ether chain such as:

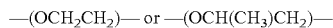

from the viewpoint of high ion-conducting property and also it is desirable that R has a bulky group of single ring, aromatic ring or hetero-cyclic ring since strength is increased.

Also it is desirable that R is a linear alkyl group since strength is increased. When R has a hydrocarbon group having no repeat unit of ether, it is desirable that the number of carbon atoms is from 1 to 30. If the number of carbon atoms is not less than 30, there is lowering of ion-conducting property.

In the formulae (1) to (3), end groups (M1) to (M6) can be synthesized easily by known reaction (hereinafter synthesis of end groups is explained by means of M1 and M2).

M1 and M2 are the same or different and each is a hydrocarbon group which has not less than 1 and not more than 50 carbon atoms, preferably not less than 1 and not more than 20 carbon atoms and may have ether bond or a fluorine-containing alkyl group which has not less than 1 and not more than 50 carbon atoms, preferably not less than 1 and not more than 20 carbon atoms.

M1 and M2 can be represented by the following formula (20):

wherein $Y^1$ is CF$_3$, CH$_3$ or HCF$_2$; $R^{20}$ is a divalent hydrocarbon group which has 1 to 49 carbon atoms and may have ether bond; $Y^2$ is any of groups represented by:

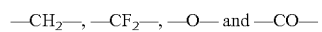

and n7 and n8 are the same or different and each is 0 or 1. Preferred $R^{20}$ is a fluorine-containing alkyl group having 1 to 20 carbon atoms.

Further there are exemplified the following structural units. CF$_3$—, CH$_3$—, CF$_3$—CF$_2$—, CF$_3$—CF$_2$—CF$_2$—, CF$_3$—CH$_2$—, CF$_3$—CF$_2$—CH$_2$—, HCF$_2$—CF$_2$CF$_2$—CH$_2$—, HCF$_2$—(CF$_2$CF$_2$)$_2$—CH$_2$—, CF$_3$—CO—, CF$_3$—CF$_2$—CO—, HCF$_2$—CF$_2$CF$_2$—CO—, HCF$_2$—(CF$_2$CF$_2$)$_2$—CO—, CF$_3$—O—, CH$_3$—O—, CF$_3$—CF$_2$—O—, CF$_3$—CF$_2$—CF$_2$—O—, CF$_3$—CH$_2$—O—, CF$_3$—CF$_2$—CH$_2$—O—, HCF$_2$—CF$_2$CF$_2$—CH$_2$—O—, HCF$_2$—(CF$_2$CF$_2$)$_2$—CH$_2$—O—, CH$_3$—CH$_2$—, CH$_3$—CH$_2$CH$_2$—CH$_2$—, CH$_3$—CO—, CH$_3$—, CH$_2$—CO—, —CH$_3$—O—, CH$_3$—CH$_2$CH$_2$—O—, CH$_3$—(OCH$_2$CH$_2$)$_5$—O— and CH$_3$—(OCH(CH$_3$)CH$_2$)$_5$—O—

In the synthesis of the ends M1 and M2, for example, in the case of ring-opening reaction of hexafluoropropylene oxide (HFPO) with KF (potassium fluoride), one end becomes CF$_3$CF$_2$—, and in the case of ring-opening reaction of HFPO with an alkoxide of hydrocarbon alcohol such as RO—, one end becomes ROCF$_2$(CF$_3$)CF$_2$—, thus providing the corresponding end such as M or MO.

Also when the structural unit M is the structural unit derived from ring-opening reaction of HFPO, a reaction end of M becomes in an equilibrium state of —CF$_2$CF$_2$O— and —CF$_2$COF— in a solution containing F$^-$ ion. Accordingly, reaction with a halogenated alkyl arises immediately to give M1 and M2 ends. Also it is possible to convert the end after the ring-opening reaction to —CF$_3$ by fluorination.

Examples of the compound providing a hydrocarbon polyether end are as follows.

Glycidyl ether derivatives represented by the formula (8):

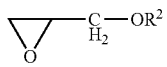

wherein $R^2$ is a monovalent group having 1 to 30 carbon atoms such as alkyl group, tetrahydropyranyl group, aralkyl group, aryl group, cycloalkyl group, alkenyl group or a derivative thereof and $R^2$ may have ether bond or fluorine atom.

The glycidyl ether derivatives of the formula (8) provide an end of hydrocarbon polyether. Among $R^2$, particularly preferred are methyl, ethyl, propyl, isopropyl, pentyl, hexyl, cyclohexyl and aryl, which may have fluorine. Those groups are desirable from the viewpoint of ion-conducting property. The cyclohexyl group and aryl group are desirable from the viewpoint of enhancement of strength.

In the formula (1), M1 and M2 are end groups having no functional group (including a crosslinkable functional group). In the formula (2), at least one of M3 and M4 has functional group, and can be introduced easily to an end of the structural unit M by the method mentioned above.

The polymer solid electrolyte prepared from the fluorine-containing polymer (A) is not intended for only a single ion conductor, and therefore it is desirable that the fluorine-containing polymer (A) has a structure having no ionic functional group (polymer of the formula (1)). The fluorine-containing polymer (A) may have ionic functional group, but if the number of ionic functional groups is increased, those groups become polymer anions, which has an adverse effect on ion-conducting property.

Therefore a moiety having high polarizability can be introduced into M3 and M4, and it is desirable that M3 and M4 have functional group, particularly nonionic functional group for the purposes to exhibit various effects such as enhancement of affinity for an electrolytic salt, enhancement of ability of holding an organic solvent when the solvent is used and enhancement of adhesion to an electrode. The nonionic functional group means a functional group which does not cause dissociation of ion, namely a functional group which does not have a structure such as $-O^-M^+$. Examples thereof are, for instance, hydroxyl group, carboxylic acid esters, sulfonic acid esters, phosphoric acid esters, carboxylic acid amides, sulfonic acid amides, phosphoric acid amides, carboxylic acid imides, sulfonic acid imides, phosphoric acid imides, carbonates, glycidyl group, epoxy group, oxetane group, alkoxysilyl group, nitro group, nitrile group, amines, hydroxyl amines, amidines, hydrazines, oximes, carbamates, ureas, imines, amine oxides, acid chloride group, acid fluoride group, vinyl group, allyl group, methacryloyl group, α-fluoroacryloyl group, acryloyl group and the like.

Particularly by employing a nonionic functional group having high polarity, a dielectric constant of the fluorine-containing polymer is increased, thereby being capable of accelerating dissociation of ion and enhancing ion-conducting property. Examples of nonionic functional group having such effects are hydroxyl group, carboxylic acid amides, sulfonic acid amides, phosphoric acid amides, carboxylic acid imides, sulfonic acid imides, phosphoric acid imides, carbonates, nitro group, nitrile group, amines, hydroxyl amines, amidines, hydrazines, oximes, carbamates, ureas, imines, amine oxides and the like.

Particularly for acidic electrolytic salts which are used as an electrolyte for fuel cells, preferred are hydroxyl group, carboxylic acid amides, sulfonic acid amides, phosphoric acid amides, carboxylic acid imides, sulfonic acid imides, phosphoric acid imides, amines, hydroxyl amines, amidines, hydrazines, oximes, carbamates, ureas, imines and amine oxides because dissociation of the electrolytic salt is increased to enhance ion-conducting property.

M3 and M4 having nonionic functional group can be represented by the following formula (21):

wherein $R^{21}$ is a monovalent hydrocarbon group having 1 to 50 carbon atoms which may have ether bond and has nonionic functional group at its end, or $-OH$ group, $-NH_2$ group, $-NO_2$ group or $-SO_3H$ group; $Y^4$ is any of groups represented by $-CH_2-$, $-CF_2-$, $-O-$ and $-CO-$.

M3 and M4 having no nonionic functional group are the same as in the above-mentioned M1 and M2. The nonionic functional group contained at an end of $R^{21}$ means the nonionic functional group mentioned above.

Further there are exemplified the following compounds.

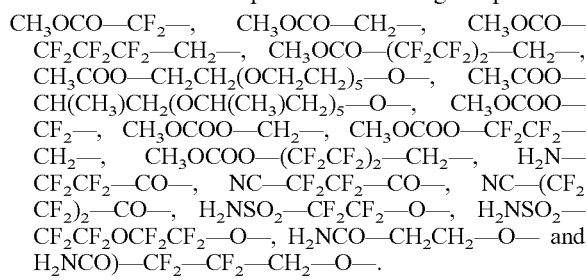

The end M3 and M4 having those functional groups can be introduced in the same manner as in the above-mentioned method of introducing M1 and M2. For example, in the ring-opening reaction of anion polymerization of HFPO, as mentioned above, a reaction end of M becomes in an equilibrium state of $-CF_2CF_2O-$ and $-CF_2COF$ in a solution containing F-ion, and by reaction with methanol or acetic acid chloride, ester which is a functional group can be introduced to the end. Also when isolation is carried out while the end is an acid fluoride and then a proper polyfunctional compound, for example, HO—R—COOMe is added, an ester group can be introduced to the end. Also when among the glycidyl ether derivatives of the above-mentioned formula (8), one having functional group is used, the functional group can be introduced.

In those fluorine-containing polymers having a fluorine-containing polyether structural unit M in the polymer trunk chain, a certain level of strength can be attained by properly selecting the ends of M1 and M2, or M3 and M4, or by selecting a proper kind of electrolytic compound in a proper amount.

However in order to increase the strength more, crosslinking is effective. In this case, it is preferable to introduce crosslinking sites to an end of the fluorine-containing polymer (A), and by the crosslinking, the strength is increased. It is concretely preferable to introduce M5 or M6 having crosslinkable functional group to the polymer end.

Examples of such a functional group which can be the crosslinking site are, for instance, hydroxyl group, carboxylic acid, sulfonic acid, phosphoric acid, carboxylic acid esters, sulfonic acid esters, phosphoric acid esters, carboxylic acid amides, sulfonic acid amides, phosphoric acid amides, carboxylic acid imides, sulfonic acid imides, phosphoric acid imides, carbonates, glycidyl group, epoxy group, oxetane group, alkoxysilyl group, nitrile group, amino group, acid chloride group, acid fluoride group, vinyl group, allyl group, methacrylate group, α-fluoroacryloyl group, acryloyl group and the like.

Among them, with respect to glycidyl group, epoxy group, oxetane group, alkoxysilyl group, vinyl group, allyl group, methacryloyl group, a-fluoroacryloyl group and acryloyl group, the same groups are reacted with each other by a radical or a cation. On the other hand, the other groups react with a different functional group to be crosslinked.

Among those functional groups, preferred is at least one selected from the group consisting of hydroxyl group, carboxylic acid, sulfonic acid, epoxy group, oxetane group, alkoxysilyl group, nitrile group, amino group, methacryloyl group, a-fluoroacryloyl group and acryloyl group.

Among M5 and M6, those which have a crosslinkable functional group can be represented by the following formula (22):

$$R^{22}-Y^5- \quad (22)$$

wherein $R^{22}$ is a monovalent hydrocarbon group having 1 to 50 carbon atoms which may have ether bond and has a crosslinkable functional group, or —OH group, —NH$_2$ group, —NO$_2$ group or —SO$_3$H group; $Y^5$ is any of the groups represented by —CH$_2$—, —CF$_2$—, —O— and —CO—.

Among M5 and M6, those which do not have crosslinkable functional group are the same as the mentioned M1 and M2. The crosslinkable functional group contained in the end of $R^{22}$ means the crosslinkable functional group mentioned supra.

Concretely there are exemplified the following compounds.

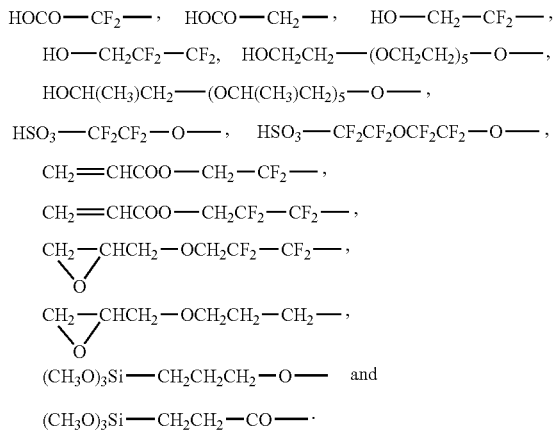

Also the structural units having nonionic functional group which are exemplified in the above $R^{21}$ can be used as the structural units having the crosslinkable functional group $R^{22}$.

Those end M5 and M6 having crosslinkable functional group can be introduced in the same manner as in the above-mentioned method of introducing M1 and M2.

For example, when the compound represented by the formula (9) is introduced, a fluorine-containing polymer in which vinyl group, allyl group, acryloyl group or methacryloyl group is introduced as the crosslinkable functional group to the M6 unit can be obtained. Glycidyl ether derivatives having un-saturated group which are represented by the formula (9):

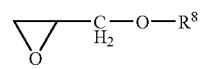

wherein $R^8$ is a substituent having 1 to 30 carbon atoms which may have ether bond and has an ethylenic un-saturated group.

Examples of the compounds which have an ethylenic un-saturated group and are represented by the formula (9) are allyl glycidyl ether, 4-vinylcyclohexyl glycidyl ether, α-terpenyl glycidyl ether, cyclohexenylmethyl glycidyl ether, p-vinylbenzyl glycidyl ether, vinyl glycidyl ether, glycidyl acrylate, glycidyl methacrylate, glycidyl sorbitate, glycidyl cinnamate, and partly fluorinated compounds thereof. Among them, allyl glycidyl ether, glycidyl acrylate, glycidyl methacrylate and glycidyl cinnamate are desirable from the viewpoint of enhancement of mechanical strength and crosslinkability.

Also, for example, when the compound represented by the formula (10) is used, a fluorine-containing polymer in which an alkoxysilyl group is introduced as the crosslinkable functional group to the end M5 or M6 can be obtained.

Glycidyl ether derivatives having an un-saturated group which are represented by the formula (10):

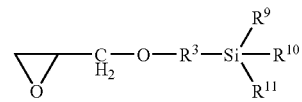

wherein $R^3$ is a divalent group having 1 to 30 carbon atoms such as alkylene group, tetrahydropyranylene group, aralkylene group, aryl group, cycloalkylene group, alkenylene group or a derivative thereof, and $R^3$ may have ether bond or fluorine atom; $R^9$, $R^{10}$ and $R^{11}$ are the same or different and each is an alkoxyl group or an alkyl group and at least one of $R^9$, $R^{10}$ and $R^{11}$ is an alkoxyl group.

Further concretely there are exemplified glycidoxymethyltrimethoxysilane, glycidoxymethymethyldimethoxysilane, glycidoxyethyltrimethoxysilane, glycidoxyethylmethyldimethoxysilane, glycidoxypropyltrimethoxysilane, 1,2-epoxypropyltrimethoxysilane, 1,2-epoxypropylmethyldimethoxysilane, 1,2-epoxybutyltrimethoxysilane, 1,2-epoxybutyldimethoxysilane, 1,2-epoxypentyltrimethoxysilane, and partly fluorinated compounds thereof.

The fluorine-containing polymer (A) of the formula (3) having crosslinkable functional group is subjected to crosslinking and is used as a polymer solid electrolyte. When an ionic functional group is used as a crosslinking site, it is desirable that after the crosslinking, the ionic functional group does not remain as far as possible.

The crosslinking can be carried out by using the crosslinkable functional group contained in the end group M5 and/or M6 in the formula (3) or by adding a crosslinking agent. By the mentioned crosslinking, the fluorine-containing polymer can be used for applications requiring strength such as a battery electrolyte, capacitor electrolyte and the like.

When crosslinking is carried out only by using the fluorine-containing polymer of the formula (3), two or more crosslinking sites are required at the end or side chain of M5 or M6 in the formula (3). It is desirable that M5 or M6 has glycidyl group, oxetane group, acryloyl group, methacryloyl group or alkoxysilyl group from the viewpoint of reactivity and easy crosslinking.

For crosslinking, various known methods can be used. For example, in the case of crosslinking of the fluorine-containing polymer of the formula (3) having glycidyl group, oxetane group or epoxy group, the crosslinking can be carried out by thermal polymerization or cation polymerization using a photo-cation generator. There are various known photo-cation generators, and among them, an optional one may be used. Concretely known photo-cation generators such as organic halogen compounds, sulfonic acid ester, onium salt, diazonium salt and disulfon compounds may be used.

Also a sensitizer may be used, and various kinds of known sensitizers can be used. Examples thereof are acetophenone, benzoin ether, benzophenone and azide sensitizers.

In the case of crosslinking of the fluorine-containing polymer of the formula (3) having an acryloyl group, methacryloyl group, the crosslinking can be carried out by thermal polymerization or radical polymerization using a photo-radical generator. There are various known photo-radical generators, and among them, an optional one may be used.

Concretely there are benzyl ketal, α-hydroxyacetophenone, α-aminoacetophenone, acylphosphine oxide, metallocene, titanocene, trichloromethyltriazine and oxime ester photo-radical generators and the like.

Also a sensitizer may be used, and various kinds of known sensitizers can be used. Examples thereof are acetophenone, benzoin ether, benzophenone and azide sensitizers.

In the case of crosslinking of the fluorine-containing polymer of the formula (3) having an alkoxysilyl group, the crosslinking can be carried out by reaction of a reactive silicon group with water.

Also there may be used, as a catalyst, an acid; an organometallic compound, i.e. a tin compound such as tin octylate or dibutyltindilaurate, a titanium compound such as tetrabutyl titanate or tetrapropyl titanate or an aluminum compound such as aluminum trisacetyl acetate and aluminum trisethyl acetoacetate; and an amine compound such as butyl amine, monoethanol amine, benzyl amine or guanine.

When crosslinking by adding a crosslinking agent, there can be used, as a crosslinking agent, a compound which has two or more functional groups being capable of reacting with the crosslinking site in the formula (3). Such a compound can be used optionally. From the viewpoint of reactivity and easy crosslinking, the crosslinking agent is desirably a polyfunctional glycidyl derivative, polyfunctional acryl-methacryl derivative, or a compound having alkoxysilyl group, polyfunctional amino group, polyfunctional hydroxyl group or polyfunctional ester group.

Examples of the crosslinking agent are the following compounds.

Diglycidyl ether derivatives represented by the formula (11):

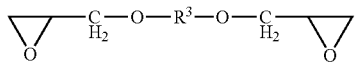

wherein $R^3$ is a divalent group having 1 to 30 carbon atoms such as alkylene group, tetrahydropyranylene group, aralkylene group, aryl group, cycloalkylene group, alkenylene group or a derivative thereof, and $R^3$ may have ether bond or fluorine atom.

The compounds of the formula (11) are bi-functional diglycidyl ether derivatives and act as a crosslinking agent.

Among those $R^3$, preferred are methylene group, ethylene group, propylene group, isopropylene group, pentylene group, hexylene group, cyclohexylene group and aryl group which may have fluorine. Those groups are desirable from the viewpoint of ion-conducting property, and also cyclohexylene group and aryl group are desirable from the viewpoint of enhancement of strength.

Further there are concretely exemplified 2,3-epoxypropyl-2,3-epoxy-2-methylpropyl ether, ethyleneglycol-2,3-epoxypropyl-2,3-epoxy-2-methylpropyl ether, diethyleneglycol-2,3-epoxypropyl-2,3-epoxy-2-methylpropyl ether, 2-methyl-1,2,3,4-diepoxybutane, 2-methyl-1,2,3,4-diepoxypentane, 2-methyl-1,2,3,4-diepoxyhexane, hydroquinone-2,3-epoxypropyl-2,3-epoxy-2-methylpropyl ether, catechol-2,3-epoxypropyl-2,3-epoxy-2-methylpropyl ether, and partly fluorinated compounds thereof.

Those compounds may be subjected to crosslinking in combination with the fluorine-containing polymer of the formula (3) having hydroxyl group, glycidyl group, epoxy group or oxetane group. Crosslinking reaction and an initiator mentioned supra are employed.

Also there are compounds represented by the formula (12) as a crosslinking agent.

Diamine derivatives or diol derivatives represented by the formula (12):

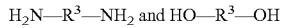

wherein $R^3$ is a divalent group having 1 to 30 carbon atoms such as alkylene group, tetrahydropyranylene group, aralkylene group, aryl group, cycloalkylene group, alkenylene group or a derivative thereof, and $R^3$ may have ether bond or fluorine atom.

Further there are concretely diol derivatives such as ethylene diol, propylene diol, hexene diol, benzene diol, toluene diol, naphthalene diol, 2,2-bis(4-phenol)-isopropane, 2,2-bis(4-phenol)-1,1,1,3,3,3-hexafluoroisopropane or partly fluorinated compounds thereof; and diamine derivatives such as ethylene diamine, propylene diamine, hexene diamine, diaminobenzene, diaminotoluene, diaminonaphthalene, 2,2-bis(4-aminophenyl)-isopropane, 2,2-bis(4-aminophenyl)-1,1,1,3,3,3-hexafluoroisopropane or partly fluorinated compounds thereof.

Those diamine and diol derivatives can be crosslinked by reaction with an acid fluoride group or an ester group in the formula (3). The crosslinking reaction is initiated by heat.

The third crosslinking agents are compounds represented by the formula (13).

Acrylate derivatives represented by the formula (13):

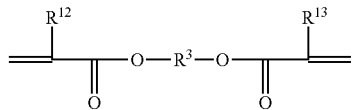

wherein $R^3$ is a divalent group having 1 to 30 carbon atoms such as alkylene group, tetrahydropyranylene group, aralkylene group, aryl group, cycloalkylene group, alkenylene group or a derivative thereof, and $R^3$ may have ether bond or fluorine atom; $R^{12}$ and $R^{13}$ are the same or different and each is hydrogen atom, fluorine atom or trifluoromethyl group.

Further there are concretely ethylene diol diacrylate, ethylene diol dimethacrylate, propylene diol dimethacrylate, 1,4-bis(2-hydroxyhexafluoroisopropyl)cyclohexanedimethacrylate, 1,4-bis(2-hydroxyhexafluoroisopropyl)phenyl-diacrylate, 1,4-dihydroxycyclohexane-diacrylate, 2,2-bis(4-hydroxyphenyl)-1,1,1,3,3,3-hexafluoroisopropane-diacrylate, 2,2-bis(4-hydroxyphenyl)-1,1,1,3,3,3-hexafluoroisopropane-dimethacrylate, 2,2-bis(4-hydroxyphenyl)-1,1,1,3,3,3-hexafluoroisopropane-di(α-fluoroacrylate) and partly fluorinated compounds thereof.

Those compounds are crosslinked with the fluorine-containing polymer of the formula (3) having acryloyl-methacryloyl group, vinyl group or allyl group by radical polymerization using a radical generator or heat. There are various known photo-radical generators, and among them, an optional one may be used. Examples of the photo-radical generator and sensitizer are as raised supra.

The fourth crosslinking agents are compounds represented by the formula (14).

Silicon-containing compounds represented by the formula (14):

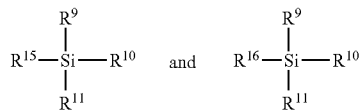

wherein $R^{16}$ is a monovalent group having 1 to 30 in total of carbon atoms and Si atoms such as alkyl group, tetrahydropyranyl group, aralkyl group, aryl group, cycloalkyl group, alkenyl group or a derivative thereof which may have ether bond, and may have fluorine atom; $R^9$, $R^{10}$, $R^{11}$ and $R^{15}$ are the same or different and each is an alkoxyl group or an alkyl group, and at least one of them is an alkoxyl group.

Further there are tetramethoxysilane, tetraethoxysilane, methyltrimethoxysilane, methyltriethoxysilane, ethyltrimethoxysilane, ethylmethyldimethoxysilane and the like.

Those compounds may be subjected to crosslinking together with the fluorine-containing polymer of the formula (3) having an alkoxysilyl group. The crosslinking reaction can be carried out by reaction of a reactive silicon group with water. A catalyst to be used for the crosslinking is as mentioned supra.

Those crosslinkable monomer components and crosslinking agents can be blended in optional amounts in order to obtain desired strength. However it is desirable that an amount of the crosslinking agent does not exceed 100 parts by weight based on 100 parts by weight of fluorine-containing polymer. If the amount exceeds 100 parts by weight, an excellent effect derived from the fluorine-containing polyether unit (M) is not exhibited. Further desirably the amount of crosslinking agent is not more than 50 parts by weight. The lower limit thereof is an amount which enables sufficient crosslinking to be achieved.

In the fluorine-containing polymer (A) of the formula (2), the end M3 or M4 having functional group may be crosslinkable functional groups or may additionally have crosslinkable functional group. Similarly in the fluorine-containing polymer (A) of the formula (3), the end M5 or M6 having crosslinkable functional group may have other functional group than the crosslinkable functional group, particularly a nonionic functional group.

Next, the non-crystalline fluorine-containing polymer (A) having the structural unit D in its side chain is explained below.

Preferred examples of the non-crystalline fluorine-containing polymer (A) having the structural unit D in its side chain are polymers represented by the following formula (4) and in addition, polymers represented by the formulae (5) to (7).

Non-crystalline fluorine-containing polymer represented by the formula (4):

-(K)-(L)-   (4)

in which the structural unit K is a structural unit which is derived from a fluorine-containing ethylenic monomer and has, in its side chain, a structural unit D1 represented by the formula (D1):

-(d1)$_{n1}$-(d2)$_{n2}$-(d3)$_{n3}$-(d4)$_{n4}$- wherein (d1) is —(OCF$_2$CF$_2$CF$_2$)—,
(d2) is —(OCFX$^1$CF$_2$)— or —(OCF$_2$CFX$^1$)—,
(d3) is —(OCFX$^2$)—,
(d4) is —(OCH$_2$CF$_2$CF$_2$)— or —(OCF$_2$CF$_2$CH$_2$)—;

n1, n2, n3 and n4 are the same or different and each is 0 or an integer of 1 or more, and n1+n2+n3+n4 is an integer of from 5 to 100; $X^1$ and $X^2$ are the same or different and each is F or CF$_3$; the structural unit L is a structural unit derived from a monomer copolymerizable with the monomer providing the structural unit K, and the structural units K and L are contained in amounts of from 0.01 to 100% by mole and from 0 to 99.99% by mole, respectively.

Examples of the structural unit K are structural units K1 to K3 in the following formulae (5) to (7).

Non-crystalline fluorine-containing polymer represented by the formula (5):

-(K1)-(L1)-   (5)

in which the structural unit K1 is a structural unit derived from a fluorine-containing ethylenic monomer and represented by the formula (K1):

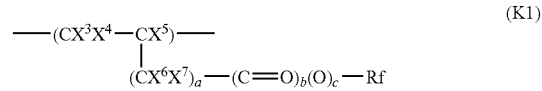

wherein $X^3$ and $X^4$ are the same or different and each is H or F; $X^5$ is H, F, CH$_3$ or CF$_3$; $X^6$ and $X^7$ are the same or different and each is H, F or CF$_3$; Rf is a fluorine-containing organic group having the above-mentioned structural unit D1; a is 0 or an integer of from 1 to 3; b and c are the same or different and each is 0 or 1; the structural unit L1 is a structural unit derived from a monomer copolymerizable with the fluorine-containing ethylenic monomer providing the structural unit K1, and the structural units K1 and L1 are contained in amounts of from 0.01 to 100% by mole and from 0 to 99.99% by mole, respectively.

Non-crystalline fluorine-containing polymer represented by the formula (6):

-(K2)-(L2)-   (6)

in which the structural unit K2 is a structural unit derived from a fluorine-containing ethylenic monomer and represented by the formula (K2):

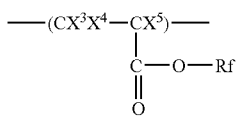

(K2)

wherein $X^3$ and $X^4$ are the same or different and each is H or F; $X^5$ is H, F, $CH_3$ or $CF_3$; Rf is a fluorine-containing organic group having the above-mentioned structural unit D1; the structural unit L2 is a structural unit derived from a monomer copolymerizable with the fluorine-containing ethylenic monomer providing the structural unit K2, and the structural units K2 and L2 are contained in amounts of from 0.01 to 100% by mole and from 0 to 99.99% by mole, respectively.

Non-crystalline fluorine-containing polymer represented by the formula (7):

-(K3)-(L3)-   (7)

in which the structural unit K3 is a structural unit derived from a fluorine-containing ethylenic monomer and represented by the formula (K3):

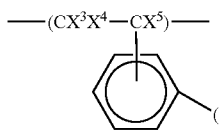

(K3)

wherein $X^3$ and $X^4$ are the same or different and each is H or F; $X^5$ is H, F, $CH_3$ or $CF_3$; Rf is a fluorine-containing organic group having the above-mentioned structural unit D1; a, b and c are the same or different and each is 0 or 1; the structural unit L3 is a structural unit derived from a monomer copolymerizable with the fluorine-containing ethylenic monomer providing the structural unit K3, and the structural units K3 and L3 are contained in amounts of from 0.01 to 100% by mole and from 0 to 99.99% by mole, respectively.

The structural unit K1 encompasses one having a side chain of ether type and one having a side chain of ester type (K2).

Examples of the monomer providing the structural unit K1 of ether type are, for instance, fluorine-containing vinyl ethers and fluorine-containing allyl ethers. Examples thereof are concretely the following monomers. Rf is as defined above.

$CH_2$=CHO-Rf, $CH_2$=CHCH$_2$O-Rf, $CF_2$=CFO-Rf, $CF_2$=CFCF$_2$O-Rf, $CH_2$=CFO-Rf, $CH_2$=CFCF$_2$O-Rf, $CF_2$=CHO-Rf, $CF_2$=CHCF$_2$O-Rf

The fluorine-containing polymers prepared using those fluorine-containing allyl ethers and fluorine-containing vinyl ethers as monomers have high strength since the polymers are prepared from ethylenic monomers. Also polymers having oxidation resistance and electrochemical stability can be obtained since those monomers are copolymerizable with fluoroolefins such as tetrafluoroethylene, vinylidene fluoride and chlorotrifluoroethylene. Particularly when vinylidene fluoride is used as a copolymerizable component, a dielectric constant of the polymer can be increased and ion dissociation of an electrolytic salt can be enhanced.

Particularly the monomers such as $CH_2$=CHO-Rf, $CH_2$=CFCF$_2$O-Rf and $CF_2$=CHO-Rf are desirable since polymerization thereof can be carried out solely.

Desirable examples of the monomer providing the structural unit K2 are, for instance,
$CH_2$=CHCOO-Rf, $CH_2$=C(CH$_3$)COO-Rf and $CH_2$=CFCOO-Rf because of good polymerizability and high strength of the obtained polymer and also because ion dissociation of the electrolytic compound is increased since a polarizable carbonyl group is contained therein.

Also particularly desirable as the monomer providing the structural unit K3 are styrene derivatives and α-methylstyrene derivatives because of good polymerizability, high strength of the obtained polymer and excellent electrochemical and thermal stability.

Examples of the structure of the structural unit K3 are:

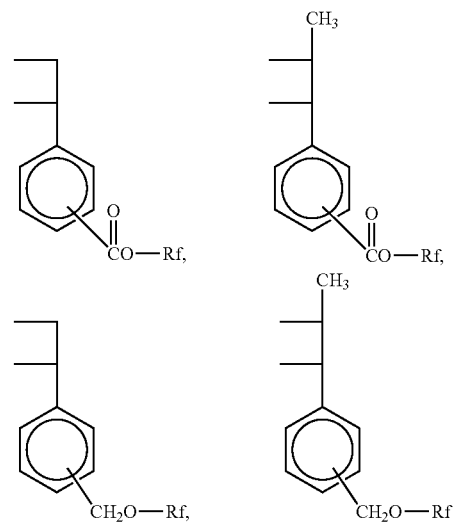

and the like which are derived from:

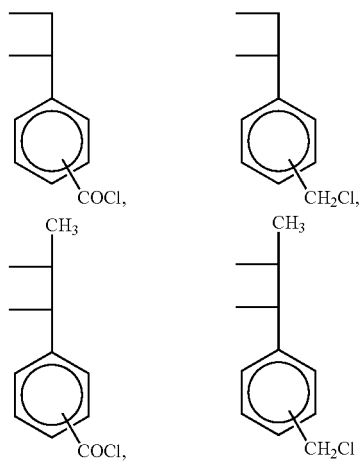

and the like

The above-mentioned monomers providing the structural units K2 and K3 are desirable because excellent polymerizability is exhibited.

Rf is a fluorine-containing alkyl group having 2 to 100 carbon atoms and ether bond and has the structural unit (D1) in its chain and may have nonionic functional group or crosslinkable functional group.

Among Rf, desirable are fluorine-containing alkyl groups which have preferably 2 to 50, further preferably 2 to 20 carbon atoms and ether bond and have the structural unit (D1) in its chain. If the number of carbon atoms exceeds 50, synthesis and refining of the monomer become difficult.

The functional group contained in Rf is a nonionic functional group or a crosslinkable functional group. Examples thereof are those raised supra. The functional group may be selected depending on a desired effect because the effect differs depending on kind of the functional group.

Rf can be represented by the following formula (23).

$$(Y^7)\text{-}(D1)\text{-}(Y^8)_{n9}\text{-} \quad (23)$$

wherein $Y^7$ is a monovalent hydrocarbon group having 1 to 30 carbon atoms which may have ether bond; $Y^8$ is a divalent hydrocarbon group having 1 to 30 carbon atoms which may have ether bond and has an end represented by —CH$_2$—, —CF$_2$— or —CO—; n9 is 0 or 1.

Examples of the Rf in the case of monomers represented by CH$_2$=CFCOO-Rf are, for instance, as follows.

CH$_2$=CFCOO—CH$_2$CF(CF$_3$)—(OCF$_2$CF(CF$_3$))$_5$—OCF$_2$CF$_2$CF$_3$,

CH$_2$=CFCOO—CH$_2$CF(CF$_3$)—(OCF$_2$CF(CF$_3$))$_{20}$—OCF$_2$CF$_2$CF$_3$,

CH$_2$=CFCOO—CH$_2$CF$_2$CF$_2$—(OCH$_2$CF$_2$CF$_2$)$_5$—OCH$_2$CF$_2$CF$_3$,

CH$_2$=CFCOO—CH$_2$CF$_2$CF$_2$—(OCH$_2$CF$_2$CF$_2$)$_{20}$—OCH$_2$CF$_2$CF$_3$,

CH$_2$=CFCOO—CH$_2$CF$_2$CF$_2$—(OCF$_2$CF$_2$CF$_2$)$_5$—OCF$_2$CF$_2$CF$_3$,

CH$_2$=CFCOO—CH$_2$CF$_2$CF$_2$—(OCF$_2$CF$_2$CF$_2$)$_{20}$—OCF$_2$CF$_2$CF$_3$,

CH$_2$=CFCOO—CH$_2$CH$_2$CH$_2$CF$_2$CF$_2$—(OCH$_2$CF$_2$CF$_2$)$_5$—OCH$_2$CF$_2$COOH,

CH$_2$=CFCOO—CH$_2$CH$_2$CH$_2$—(OCH$_2$CF$_2$CF$_2$)$_{20}$—OCH$_2$CF$_2$COOH,

CH$_2$=CFCOO—CH$_2$CH$_2$CH$_2$CF$_2$CF$_2$—(OCH$_2$CF$_2$CF$_2$)$_5$—OCH$_2$CF$_2$COOCH$_3$,

CH$_2$=CFCOO—CH$_2$CH$_2$CH$_2$—(OCH$_2$CF$_2$CF$_2$)$_{20}$—OCH$_2$CF$_2$COOCH$_3$.

In the formulae (4) to (7), the monomer providing another structural unit L, L1, L2 or L3 may be a monomer copolymerizable with the monomer providing the structural unit K, K1, K2 or K3, respectively and is not limited particularly.

Generally preferred are monomers represented by the following formulae (15) and (16).

Olefins which contain or do not contain fluorine atom and are represented by the formula (15):

$$CX^{10}X^{11}=CX^{12}X^{13} \quad (15)$$

wherein $X^{10}$, $X^{11}$, $X^{12}$ and $X^{13}$ are the same or different and each is H, F, Cl, CH$_3$ or CF$_3$.

Ethylenic monomers which contain or do not contain fluorine atom and are represented by the formula (16):

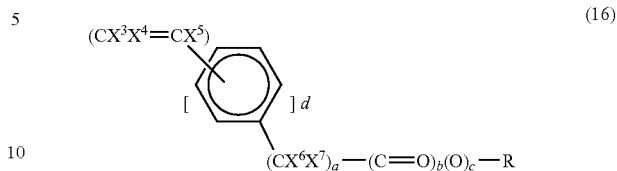

wherein $X^3$ and $X^4$ are the same or different and each is H or F; $X^5$ is H, F, CH$_3$ or CF$_3$; $X^6$ and $X^7$ are the same or different and each is H, F or CF$_3$; R is a monovalent organic group which has neither the structural unit D (or D1) nor an ionic functional group; a is 0 or an integer of from 1 to 3; b, c and d are the same or different and each is 0 or 1

Examples of the olefins represented by the formula (15) are, for instance, ethylene, propylene, vinyl chloride, vinylidene chloride, monofluoro vinyl, vinylidene fluoride, trifluoroethylene, tetrafluoroethylene, hexafluoropropylene, chlorotrifluoroethylene and the like.

The monomers represented by the formula (15) are suitable as the monomer for the structural unit L1 because of good polymerizability with the monomers for the structural unit K1. Particularly preferred are fluorine-containing olefins such as tetrafluoroethylene, vinylidene fluoride, trifluoroethylene and chlorotrifluoroethylene.

The monomers represented by the formula (16) are suitable as the monomers for the structural units L2 and L3 because of good polymerizability with the monomers for the structural units K2 and K3. Particularly preferred are acryl, methacryl, allylether and styrene derivatives such as:

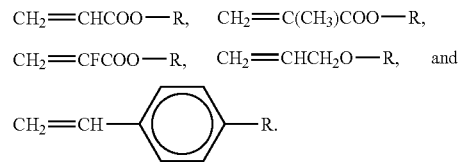

In the above-mentioned formulae, R is a monovalent organic group which has neither the structural unit D (or D1) nor an ionic functional group and may be an optional group. It is desirable that R is an alkyl group having ether bond for increasing ion-conducting property, a bulky group such as an aryl group, a cyclohexyl group or an adamantyl group for increasing strength, and a group having a polar nonionic functional group such as carbonate, amide, imide, ester or nitrile for increasing a dielectric constant.

The structural unit L, L1, L2 or L3 is contained in the fluorine-containing polymer (A) in an amount of from 0 to 99.99% by mole. The amount of those structural units exceeding 99.99% by mole is not desirable because excellent effects of the side chain of fluorine-containing polyether are not seen, namely, there arise lowering of ion-conducting property, heat resistance and durability.

Also it is desirable that the fluorine-containing polymer (A) having the structural unit D1 in its side chain contains the structural unit D1 in an amount of not less than 10% by weight, preferably not less than 50% by weight.

With respect to the molecular weight of the non-crystalline fluorine-containing polymer (A) of the present invention, the polymer is a fluorine-containing polymer having, for example, an average degree of polymerization of from 5 to 10,000. A number average molecular weight of the polymer varies depending on the average molecular weight of only the structural unit D1 (the number of repeat units of fluorine-containing polyether) and can be selected within a range of not less than 5,000 and not more than 20,000,000, preferably not less than 10,000 and not more than 5,000,000, particularly preferably not less than 10,000 and not more than 1,000,000.

The fluorine-containing polymers (A) represented by the formulae (4) to (7) can be obtained by polymerization of an ethylenic monomer providing the structural unit K (K1 to K3) with an ethylenic monomer providing the structural unit L (L1 to L3). For the polymerization, a suitable polymerization method may be selected from known methods such as cation polymerization, radical polymerization and anion polymerization. From the viewpoint of easiness of synthesis in industrial scale, radical polymerization is desirable. A radical polymerization initiator can be selected optionally from azo compounds, inorganic peroxides, organic peroxides, light, electron, radiation and the like, and the polymerization can be carried out by an optional method such as solution polymerization, bulk polymerization, emulsion polymerization or suspension polymerization.

The fluorine-containing polymers represented by the formulae (4) to (7) are polymers prepared from ethylenic monomers, and are superior in strength to the fluorine-containing polymers which are represented by the formula (1) and have a trunk chain of fluorine-containing polyether. Therefore particularly no crosslinking is necessary.

In order to further increase strength, there can be used crosslinked polymers obtained by introducing a crosslinkable functional group to the fluorine-containing polymers represented by the formulae (4) to (7) and then subjecting the polymers to crosslinking. The crosslinked polymers can be obtained by crosslinking using the crosslinkable functional group contained in the side chain of polymers of the formulae (4) to (7) and also by crosslinking using a crosslinking agent. By such crosslinking, the polymers can be used for applications such as a battery electrolyte and capacitor electrolyte which are required to have strength.

It is desirable, from the viewpoint of reactivity and easy crosslinking, to use, as a monomer for the structural unit L (L1 to L3), a monomer having, in its side chain, desirably glycidyl group, epoxy group, oxetane group, acryloyl-methacryloyl group, alkoxysilyl group or amino group as the crosslinkable functional group.

When crosslinking using a crosslinking agent, a compound having two or more functional groups reacting with the crosslinkable functional group of the fluorine-containing polymers of the formulae (4) to (7) can be used as a crosslinking agent. Such a compound may be optionally selected, and from the viewpoint of reactivity and easy crosslinking, is desirably a compound having glycidyl derivative, acryl-methacryl group, alkoxysilyl group or amino group.

Concretely the same monomers having crosslinkable functional group and crosslinking agents as exemplified above can be used.

Those monomers having crosslinkable functional group and crosslinking agents can be blended in optional amounts to obtain desirable strength. It is desirable that an amount of crosslinking agent does not exceed 100 parts by weight based on 100 parts by weight of fluorine-containing polymer. If the amount of crosslinking agent exceeds 100 parts by weight, an excellent effect attributable to the structural unit D (D1) derived from the fluorine-containing polyether cannot be recognized. Further it is desirable that the amount of crosslinking agent is not more than 50 parts by weight.

In the present invention, the fluorine-containing polymer (A) which has both of a unit having the structural unit D in its trunk chain and a unit having the structural unit D 1 in its side chain may be used. It is a matter of course that the polymers of the formulae (1) to (3) are used in combination of the polymers of the formulae (4) to (7).

The solid electrolyte of the present invention basically becomes in the solid form only by the fluorine-containing polymer (A). In addition to the above-mentioned crosslinking method, there are means for increasing strength of the fluorine-containing polymer (A), such as a method of making a composite polymer using other polymer having high strength together, a method of mixing insulating ceramics, a method of mixing an inorganic compound having ion-conducting property and the like (JP63-102104A, JP8-148163A, JP6-140051, JP11-35765A, etc.). In the fluorine-containing polymer of the present invention, too, strength thereof can be increased by the same methods as mentioned above.

In the composite polymers which contain insulating ceramics or an inorganic compound having ion-conducting property, a step for equalizing a particle size of particles of ceramics and inorganic salt is required separately in order to uniformly disperse the particles in the solid electrolyte.

It is desirable that the fluorine-containing polymer is mixed with a polymer which does not have such disadvantages. It is preferable that a matrix polymer to be mixed is a polymer having a number average molecular weight of from 10,000 to 1,000,000 and obtained from a monomer represented by the formula:

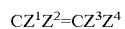

wherein $Z^1$, $Z^2$, $Z^3$ and $Z^4$ are the same or different and each is hydrogen atom, halogen atom, $CH_3$ or $CF_3$.

Desired polymers are homopolymers or copolymers which are obtained from ethylene, propylene, tetrafluoroethylene, vinylidene fluoride, chlorotrifluoroethylene, monofluoroethylene and hexafluoropropylene and have a number average molecular weight of from 10,000 to 1,000,000. If the number average molecular weight is less than 10,000, there is a problem with strength, and if the number average molecular weight exceeds 1,000,000, moldability is lowered. The number average molecular weight is desirably not less than 50,000 and not more than 500,000. Also porous polymers (having porosity) are desired from the viewpoint of miscibility with the fluorine-containing polymer.

Particularly desired are polytetrafluoroethylene, polyvinylidene fluoride, vinylidene fluoride/hexafluoropropylene copolymer and porous polymers thereof.

Those fluorine-containing polymers are excellent in durability. Also polyvinylidene fluoride and vinylidene fluoride/hexafluoropropylene copolymer have advantages such as high dielectric constant and excellent property of holding an electrolytic solution.

With respect to a weight ratio of the fluorine-containing polymer to the mentioned matrix polymer, it is desirable that the former polymer is contained in an amount of from 10 to 99 parts by weight and the latter polymer is contained in an amount of from 1 to 90 parts by weight. If the amount of the former polymer is less than 10 parts by weight, characteristics of the fluorine-containing polymer cannot be used effectively, and if the amount of the latter polymer is less than 1 part by weight, an effect of increasing strength cannot be recognized. It is further desirable that the fluorine-containing polymer is contained in an amount of not less than 20 parts by weight and not more than 80 parts by weight, and the matrix polymer is contained in an amount of not less than 20 parts by weight and not more than 80 parts by weight.

The non-crystalline fluorine-containing polymer (A) having a specific fluorine-containing ether structural unit is as explained above, and the present invention relates to the solid electrolyte basically comprising the mentioned fluorine-containing polymer (A) and the electrolytic compound (B).

When the fluorine-containing polymer (A) itself is in the solid form, the solid electrolyte (so-called totally solid electrolyte) can be produced by mixing the electrolytic compound (B) without using a solvent.

Namely, the first of the present invention relates to the solid electrolyte comprising the mentioned non-crystalline fluorine-containing polymer (A) having the structural unit D and the electrolytic compound (B).

In the present invention, "solid electrolyte" means an electrolyte in a state having no flowability, and encompasses electrolytes in a completely solidified form, rubber-like form and gel form. Those forms can be obtained only by the non-crystalline fluorine-containing polymer, and in order to make further "solid" form, various additives (for example, the mentioned matrix polymer, electrolytic compound, etc.) are used.

Also when the non-crystalline fluorine-containing polymer (A) is in the solidified form or in the rubber-like form, a solvent may be mixed to make the polymer in the form of gel. When the non-crystalline fluorine-containing polymer (A) is in the liquid form or in the form of gel, a reinforcing agent or a thickener such as the matrix polymer may be mixed to make the polymer in the form of gel or in the solidified form.

The electrolytic compound (B) can undergo ionic dissociation and cause ion transport, and encompasses (b1) acids such as an inorganic acid and organic acid, (b2) inorganic salts and organic salts obtained by neutralizing the acids, (b3) ionic polymers or salts thereof (polymer anions) and further (b4) liquid ionic compounds. The acids and liquid ionic compounds can be used as an electrolytic compound since the acids exhibit a high degree of proton transport and the liquid ionic compounds exhibit high ion-conducting property.

Examples of the electrolytic compound (B) are as follows.

(b1) Acids

There are exemplified inorganic acids such as tetrafluoroboric acid, hexafluorophosphoric acid, perchlorates, hexafluoroarsenic acid, nitric acid, sulfuric acid, phosphoric acid, hydrofluoric acid, hydrochloric acid, hydrobromic acid, hydroiodic acid and thiocyanic acid; organic acids such as trifluoromethanesulfonic acid, pentafluoroethanesulfonic acid, heptafluoropropylsulfonic acid, bis(trifluoromethanesulfonyl)imidic acid, acetic acid, trifluoroacetic acid, propionic acid, benzenesulfonic acid, toluenesulfonic acid, n-hexanesulfonic acid, n-octylsulfonic acid, cetylsulfonic acid, p-chlorobenzenesulfonic acid, phenolsulfonic acid, 4-nitrotoluene-2-sulfonic acid, 2-sulfobenzoic acid, nitrobenzenesulfonic acid, sulfosuccinic acid and sulfosebasic acid. Particularly preferred are strong acids such as nitric acid, sulfuric acid, hydrochloric acid and fluorine-containing alkylsulfonic acid.

(b2) Salts

There are preferably compounds comprising at least one cation selected from the group consisting of a metal cation, ammonium ion, amidinium ion and guadinium ion and at least one anion selected from the group consisting of chlorine ion, bromine ion, iodine ion, perchlorate ion, thiocyanic acid ion, tetrafluoroboron ion, nitric acid ion, carbonic acid ion, sulfuric acid ion, hypochlorous acid ion, $AsF_6^-$, $PF_6^-$, stearylsulfonic acid ion, octylsulfonic acid ion, dodecylbenzenesulfonic acid ion, naphthalenesulfonic acid ion, dodecylnaphthalenesulfonic acid ion, $R^4SO_3$—, $(R^4SO_2)(R^5SO_2)N^-$, $(R^4SO_2)(R^5SO_2)$ $(R^6SO_2)C^-$ and $(R^4SO_2)(R^5SO_2)TC^-$, wherein $R^4$, $R^5$ and $R^6$ are halogen-substituted alkyl groups or aryl groups, T represents an electron attractive group.

It is particularly preferable that $R^4$, $R^5$ and $R^6$ in the anion are the same or different and each is a perfluoroaryl group or perfluoroalkyl group having 1 to 6 carbon atoms, and the electron attractive group T is nito group, nitroso group, carbonyl group, carboxyl group, cyano group or trialkylammonium salt.

Further there are concretely inorganic salts obtained by neutralizing inorganic acids such as tetrafluoroboric acid, hexafluorophosphoric acid, perchlorates, hexafluoroarsenic acid, nitric acid, sulfuric acid, phosphoric acid, hydrofluoric acid, hydrochloric acid, hydrobromic acid, hydroiodic acid and thiocyanic acid; and organic salts obtained by neutralizing organic acids such as trifluoromethanesulfonic acid, pentafluoroethanesulfonic acid, heptafluoropropylsulfonic acid, bis(trifluoromethanesulfonyl)imidic acid, acetic acid, trifluoroacetic acid, propionic acid, benzenesulfonic acid, toluenesulfonic acid, n-hexanesulfonic acid, n-octylsulfonic acid, cetylsulfonic acid, p-chlorobenzenesulfonic acid, phenolsulfonic acid, 4-nitrotoluene-2-sulfonic acid, 2-sulfobenzoic acid, nitrobenzenesulfonic acid, sulfosuccinic acid and sulfosebasic acid.

Also it is preferable that the cation is at least one selected from the group consisting of hydrogen ion, lithium ion, sodium ion, potassium ion, cesium ion, magnesium ion, calcium ion and barium ion. (b3) Ionic polymers or salts thereof (polymer anion)

Also there can be used compounds comprising a polymer anion and a cation selected from the group consisting of hydrogen ion, metal ion, ammonium ion, amidinium ion and guadinium ion.

Namely, there can be used, as an electrolytic compound, not only the above-mentioned low molecular weight electrolytes but also ionic polymers having an ionic functional group or salts thereof (polymer anion).

Namely, polymers having —COO⁻ or —SO₃— in a side chain thereof can be used as a polymer anion. There are preferably exemplified polymers having an anionic functional group such as —SO₃— or —COO⁻ particularly at an end of the polymer side chain, concretely polyacrylic acid, polymethacrylic acid, polyphosphoric acid, sulfonated polystyrene, sulfonated polyethylene, polyvinylsulfonic acid and the like. Known as commercially available polymers are NAFFION® available from du Pont and FLEMION®.

Examples of the polymer cation are hydrogen ion, metal ion, ammonium ion, amidinium ion and guadinium ion.

(b4) Liquid Ionic Compounds

There can be used liquid ionic compounds in the liquid form and also in the solid form obtained by combining with a polymer. Various known ionic liquids can be used (Nature, 362,137, (1993), Journal of Chemical Society Chemical Communication, 929, (1993)). Concretely onium salts of cyclic amidines or pyridines are desirable.

Preferred kind of electrolytic compound (B) varies depending on applications. For example, in the case of use for an electrolyte for lithium battery, the compound (B) is selected from $LiClO_4$, $LiAsF_6$, $LiBF_4$, $LiPF_6$, $LiCF_3SO_3$, $LiC_4F_9SO_3$, $LiN(CF_3SO_2)_2$, $LiN(C_2F_5SO_2)_2$, $LiC(CF_3SO_2)_2$ and $LiC(C_2F_5SO_2)_2$. In the case of use for an electrolyte for fuel cell, there are trifluoroacetic acid, trifluoromethylsulfonic acid, pentafluoroethanesulfonic acid, heptafluoropropylsulfonic acid, sulfonated styrene, methylsulfonic acid, ethylsulfonic acid, polymers having an anionic functional group such as —$SO_3^-$ or —$COO^-$ at an end of side chain thereof and the like.

Also in the case of use for an electrolyte for capacitors, in a system where an electrolyte prepared by using water or protonic organic solvent is used, generally strong acids or alkali metal salts of strong acids are suitable. Those acids and salts are preferred because of excellent ion dissociation in water or in a protonic solvent. In this case, examples of the strong acid are inorganic strong acids such as nitric acid and sulfuric acid and organic sulfonic acids, particularly fluorine-containing alkylsulfonic acids. Examples of the organic sulfonic acids are trifluoromethanesulfonic acid, pentafluoroethanesulfonic acid, heptafluoropropylsulfonic acid, benzenesulfonic acid, toluenesulfonic acid, p-chlorobenzenesulfonic acid, nitrobenzenesulfonic acid and the like. Examples of the metal salts of strong acids are lithium salts, sodium salts and potassium salts of the above-mentioned acids and hydrochloric acid.

In a system where an electrolyte prepared using an aprotic organic solvent is used, in many cases, salts of weak acids, particularly organic salts of weak acids are generally used. Examples thereof are salts comprising an anion such as iodine ion, tetrafluoroboron ion, $BF_4^-$, $PF_6^-$, $(CF_3SO_2^-)_2C^-$, $(C_4F_9SO_2^-)_2C^-$, $(CF_3SO_2)_2N^-$ or $(C_2F_5SO_2)_2N^-$ and a cation such as ammonium ion, amidinium ion or guadinium ion. Particularly ammonium salts of tetrafluoroboron ion are often used.

Examples of the electrolytic compound used for solid display devices are the same as in electrolytes used for capacitors. Generally electrolytes prepared using an organic solvent is used, and therefore in many cases, the above-mentioned organic salts of weak acids are used.

Also the same electrolytic compounds as in electrolytes used for capacitors are used for sensors. Generally in many cases, water is used as a solvent, and therefore metal salts of strong acids, particularly alkali metal salts of inorganic strong acids are often used.

With respect to the proportion of the electrolytic compound (B) to the fluorine-containing polymer (A), the amount of (B) is from 0.01 to 100 parts by weight based on 100 parts by weight of (A). If the amount of (B) is less than 0.01 part by weight, a salt concentration is too low and ion-conducting property cannot be obtained. Also if the amount of (B) exceeds 100 parts by weight, a salt concentration is too high and polymer movement is significantly blocked and therefore ion-conducting property cannot be obtained.

In the case of totally solid polymer electrolyte produced without using a solvent, ionic conductivity greatly fluctuates depending on kind of an electrolytic compound to be used. For example, when a liquid electrolytic compound such as a liquid ionic compound (b4) or a liquid acid is used, sufficient ionic conductivity can be obtained even at room temperature. Also even in the case of solid acids or salts, acids having high acidity (pKa of 2 or less) or salts having high ionic conductivity are preferred since ionic conductivity is increased.

However in the case of using salts such as inorganic salts or organic salts, in many cases, a solvent is generally added to prepare a fluorine-containing polymer solid electrolyte in the form of gel in order to obtain more practicable ionic conductivity.

In the above-mentioned system where an electrolyte prepared using water or a protonic organic solvent is used as a solvent, generally strong acids or alkali metal salts of strong acids are suitable. Those acids and salts are preferred because of excellent ion dissociation in water or in a protonic organic solvent. In this case, examples of the inorganic strong acids are nitric acid and sulfuric acid and examples of the organic strong acids are organic sulfonic acids, particularly fluorine-containing alkylsulfonic acids. Examples of the organic strong acids are trifluoromethanesulfonic acid, pentafluoroethanesulfonic acid, heptafluoropropylsulfonic acid, benzenesulfonic acid, toluenesulfonic acid, p-chlorobenzenesulfonic acid, nitrobenzenesulfonic acid and the like. Examples of the alkali metal salts of strong acids are lithium salts, sodium salts and potassium salts of the above-mentioned acids and hydrochloric acid. Hydrochloric acid has strong corrosive property, and therefore are rarely used as an acid but often used as an alkali metal salt.

Also in the above-mentioned system where an electrolyte prepared using an aprotic organic solvent is used as a solvent, generally there are many cases where presence of proton is not desirable, and therefore, an acid is not used. The above-mentioned alkali metal salts of strong acids which are used in water or in a protonic organic solvent are low in solubility in an aprotic organic solvent and a concentration thereof cannot be increased, and therefore those alkali metal salts are not used generally. Accordingly when an aprotic organic solvent is used, in many cases, salts of weak acids are used. Also particularly organic salts of weak acids being excellent in solubility or salts of organic weak acids are used in many cases. Examples thereof are salts comprising an anion such as iodine ion, tetrafluoroboron ion, $BF_4^-$, $PF_6^-$, $(CF_3SO_2^-)C$, $(C_4F_9SO_2^-)C$, $(CF_3SO_2)_2N^-$ or $(C_2F_5SO_2)_2N^-$ and a cation such as ammonium ion, amidinium ion or guadinium ion. Particularly ammonium salts of tetrafluoroboron ion are often used. Also there is a case where lithium or sodium salts of organic weak acids such as $(CF_3SO_2^-)C$, $(C_4F_9SO_2^-)C$, $(CF_3SO_2)_2N^-$ and $(C_2F_5SO_2)_2N^-$ are used.

Namely, the second of the present invention relates to the solid electrolyte comprising (A) the above-mentioned non-crystalline fluorine-containing polymer having the structural unit D, (B) an electrolytic compound and (C) a solvent such as an organic solvent or water.

In the second solid electrolyte of the present invention, too, the non-crystalline fluorine-containing polymers (A) and the electrolytic compounds (B) mentioned supra can be preferably exemplified similarly.

Examples of the solvent (C) are an aprotic organic solvent, a protonic organic solvent and water, and an optimum solvent is selected depending on applications. For example, in the case of an electrolyte for Li ion battery, an aprotic organic solvent is selected, and in the case of an electrolyte for fuel cell, a protonic organic solvent or water is selected. Generally it is preferable that in the case of an electrochemical device using a metal cation, an aprotic organic solvent is used, and in the case of an electrochemical device using hydrogen ion, a protonic organic solvent or water is used.

As an aprotic organic solvent, an optional one can be used as far as it is chemically stable. Desirable are ethers, esters and carbonates from the viewpoint of dissociation and solubility of the electrolytic compound and also because a dielectric constant is high.

Examples of desirable aprotic organic solvent are propylene carbonate, ethylene carbonate, dimethyl carbonate, diethyl carbonate, methyl ethyl carbonate, butylene carbonate, γ-butyrolactone, 3-methyl-2-oxazoline, tetrahydrofuran, dioxane, dimethoxyethane, polyethylene oxide and triethyleneglycol dimethylether.

As a protonic organic solvent, an optional one can be used as far as it is chemically stable, and there are alcohol and carboxylic acid.

Examples of the protonic organic solvent are methanol, ethanol, propanol, isopropanol, butanol, hexanol, phenol, acetic acid, benzoic acid and partly fluorinated compounds thereof.

The solid electrolyte of the present invention can be prepared in the manner mentioned below.

For example, in the case of a totally solid electrolyte comprising (A) and (B), a method of kneading (A) and (B) or a method of dissolving and mixing (A) and (B) in a solvent and then distilling off the solvent is employed. Also, in the case where (A) is a crosslinked polymer being insoluble in a solvent, there are a method of mixing (A) with (B) before crosslinking of (A), a method of immersing a crosslinked film in a solution of (B) and then distilling off the solvent and the like method.

In the case of a solid electrolyte comprising (A), (B) and (C), there can be employed a method of using the component (C) as a solvent in the above-mentioned methods and leave the solvent present in a proper amount and a method of impregnating the totally solid electrolyte which comprises (A) and (B) and is obtained in the above-mentioned methods, with (C).

The solid electrolyte of the present invention is excellent in ion-conducting property, durability, safety, mechanical strength, etc. Making the use of those properties, a solid electrolyte in the form of thin film having a large area can be produced easily, and is applicable to various electrochemical devices. Examples of applications to electrochemical devices are electrolytes of fuel cells, electrolytes of electrolytic capacitors, electrolytes of solid display devices such as electroluminescent device and electrolytes of sensors such as a current sensor and gas sensor.

Examples of the applications to fuel cells and electrolytic capacitors (condensers) are then explained below.

Fuel cells are spotlighted as an electric generator which assures clean environment and has high generation efficiency since oxides such as sulfur and nitrogen are not generated and energy conversion efficiency is high. Fuel cells have a structure comprising a positive electrode, a negative electrode and an electrolyte, in which a gas diffusion layer and an active material are incorporated in the electrodes and the electrolyte is present between the electrodes. Fuel cells which are widely employed are ones having a polymer solid electrolyte, and a solid electrolyte impregnated with water are used suitably. Those fuel cells exhibit high ion-conducting property, but when hydrocarbon and alcohol are used as a fuel, there is a problem that carbon monoxide is generated as a by-product and poisons an electrode catalyst, thereby lowering properties of the cells. Therefore, an electrolyte prepared using an organic acid was proposed (JP8-171923A). However it is essential to operate the cell at high temperature of not less than 100° C. and therefore the cell is lack in practicability. Also when polyether oxide is used as a matrix, there is a problem that the polymer is deteriorated remarkably.

When the fluorine-containing polymer of the present invention is used as an ion conductor forming an electrolyte, a cell can be operated at room temperature, deterioration of the polymer is less and an excellent solid electrolyte for fuel cells can be obtained.

An electrolytic capacitor is produced so as to exhibit an electrostatic constant by producing an electrode having a large specific surface area by etching a bulb metal such as aluminum through a chemical and electrochemical method or by baking of powder, and then impregnating the electrode with a liquid electrolyte. As applications of the electrolytic capacitor to power source for mobile phones and portable personal computer are increasing, further downsizing and decreasing of resistance are demanded. When a liquid electrolyte having ion-conducting property is used, its ionic conductivity is low and therefore, there is a trial to use an electrolyte in the form of gel (JP2001-217149A), but the ionic conductivity is still insufficient.

However when the fluorine-containing polymer of the present invention is used as an ion conductor forming an electrolyte, the electrolyte can have sufficient ion-conducting property.

Also in an electric drive system using a fuel cell, a capacitor is used in addition to a fuel cell. The solid electrolyte of the present invention can also be used effectively on such a capacitor.

The present invention is then explained by means of examples, but is not limited to them.

In the following Examples, physical properties were evaluated using the following equipment and measuring conditions.

(1) NMR: AC-300 available from BRUKER CO., LTD. Measuring conditions of $^1$H-NMR: 300 MHz (tetramethylsilane=0 ppm) Measuring conditions of $^{19}$F-NMR: 282 MHz (trichlorofluoromethane=0 ppm)

(2) IR analysis: Measuring is carried out at room temperature with a Fourier-transform infrared spectrophotometer 1760× available from Perkin Elmer Co., Ltd.

(3) GPC: A number average molecular weight is calculated from the data measured by gel permeation chromatography (GPC) by using GPC HLC-8020 available from Toso Kabushiki Kaisha and columns available from Shodex (one GPC KF-801, one GPC KF-802 and two GPC KF-806M were connected in series) and flowing tetrahydrofuran (THF) as a solvent at a flowing rate of 1 ml/min.

(4) Measurement of impedance: An ionic conductivity is calculated by putting an electrolyte between platinum electrodes, measuring an impedance within a frequency range of from 0.1 to 10 kHz at room temperature with SOLARTRON 1280 (available from Toyo Technica) and drawing a Cole Cole's plot.

EXAMPLE 1

(Synthesis of Polymer having Fluorine-containing Ether Structure in its Trunk Chain)

Into a 1-liter four-necked flask equipped with a dry ice condenser were poured CsF (4.2 g) and triglyme (220 ml), and 189 g of hexafluoropropylene oxide (HFPO) was blown thereto with stirring at a temperature of from −10° C. to 10° C. Twenty hours after, 46.5 g of methanol was introduced to terminate a reaction. After completion of the reaction, separation of solution and concentration were carried out using HCFC-14 1b/water and a viscous liquid was obtained. As a result of GPC, $^1$H-NMR and $^{19}$F-NMR analyses, this product was found to be a polymer having methyl ester at its ends which was obtained by ring-opening polymerization of HFPO. A number average molecular weight thereof was 3,900.

EXAMPLE 2

(Synthesis of Polymer having Fluorine-containing Ether Structure in its Trunk Chain)

Into a dry pressure resistant closed vessel were poured CsF (4.2 g) and triglyme (220 ml), and 189 g of hexafluoropropylene oxide (HFPO) was blown thereto with stirring at a temperature of from −10° C. to 10° C. Twenty hours after, 66 g of propylene oxide was introduced thereto. After the introduction, temperature was elevated gradually and after stirring at 40° to 60° C. for 24 hours, 5 g of acetic acid chloride was introduced to terminate a reaction. After completion of the reaction, separation of solution and concentration were carried out using HCFC-14 1b/water and 136 g of a rubber-like solid was obtained. As a result of GPC, $^1$H-NMR and $^{19}$F-NMR analyses, this product was found to be a polymer having acetic acid ester at its end which was obtained by ring-opening polymerization of HFPO/propylene oxide. A molar ratio thereof was 46/54, and a number average molecular weight was 5,500.

EXAMPLE 3

(Synthesis of Polymer having Fluorine-containing Ether Structure in its Trunk Chain)

Into a dry pressure resistant closed vessel were poured CsF (4.2 g) and triglyme (220 ml), and 189 g of hexafluoropropylene oxide (HFPO) was blown thereto with stirring at a temperature of from −10° C. to 10° C. Twenty hours after, 66 g of propylene oxide was introduced thereto. After the introduction, temperature was elevated gradually and after stirring at 40° to 60° C. for 24 hours, 8 g of acetic acid chloride was introduced to terminate a reaction. After completion of the reaction, separation of solution and concentration were carried out using HCFC-14 1b/water and 131 g of a rubber-like solid was obtained. As a result of GPC, $^1$H-NMR and $^{19}$F-NMR analyses, this product was found to be a polymer having acetic acid ester at its end which was obtained by ring-opening polymerization of HFPO/propylene oxide. A molar ratio thereof was 46/54, and a number average molecular weight was 5,600.

EXAMPLE 4

(Synthesis of Polymer having Fluorine-containing Ether Structure in its Trunk Chain)

Into a dry pressure resistant closed vessel were poured CsF (4.2 g) and triglyme (220 ml), and 189 g of hexafluoropropylene oxide (HFPO) was blown thereto with stirring at a temperature of from −10° C. to 10° C. Twenty hours after, 66 g of propylene oxide and 16 g of glycidyl acrylate were introduced thereto. After the introduction, temperature was elevated gradually and after stirring at 40° to 60° C. for 24 hours, 5 g of acetic acid chloride was introduced to terminate a reaction. After completion of the reaction, separation of solution and concentration were carried out using HCFC-14 1b/water and 139 g of a rubber-like solid was obtained. As a result of GPC, $^1$H-NMR and $^{19}$F-NMR analyses, this product was found to be a polymer having acetic acid ester at its end which was obtained by ring-opening polymerization of HFPO/propylene oxide/glycidyl acrylate. A molar ratio thereof was 47/46/7, and a number average molecular weight was 5,300.

EXAMPLE 5

(Synthesis of Polymer having Fluorine-containing Ether Structure in its Trunk Chain)

Into a dry pressure resistant closed vessel were poured CsF (4.2 g) and triglyme (220 ml), and 189 g of hexafluoropropylene oxide (HFPO) was blown thereto with stirring at a temperature of from −10° C. to 10° C. Twenty hours after, 66 g of propylene oxide and 62 g of glycidyl ethoxysilane were introduced thereto. After the introduction, temperature was elevated gradually and after stirring at 40° to 60° C. for 24 hours, 5 g of acetic acid chloride was introduced to terminate a reaction. After completion of the reaction, separation of solution and concentration were carried out using HCFC-14 1b/water and 139 g of a rubber-like solid was obtained. As a result of GPC, $^1$H-NMR and $^{19}$F-NMR analyses, this product was found to be a polymer having acetic acid ester at its end which was obtained by ring-opening polymerization of HFPO/propylene oxide/glycidyl acrylate. A molar ratio thereof was 45/46/9, and a number average molecular weight was 6,200.

EXAMPLE 6

(Synthesis of Polymer having Fluorine-containing Ether Structure in its Side Chain)

In a 100 ml four-necked glass flask equipped with a stirrer and a thermometer, 5 g of α-fluoroacrylate:
$CH_2=CFCOOCH_2CF_2CF_2(OCF_2CF_2CF_2)_7OCF_2CF_2CF_3$
having a fluorine-containing ether in its side chain was dissolved in 20 ml of MIBK solution, and 0.02 g of AIBN was added thereto, followed by sufficiently replacing the inside of the flask with nitrogen and then stirring at 70° C. for eight hours in nitrogen gas stream. The obtained solution was subjected to re-precipitation using hexane as a poor solvent, and a solid was separated and vacuum-dried to obtain 4.1 g of a semi-transparent rubber-like solid.

According to $^{19}$F-NMR, $^1$H-NMR and IR analyses, this polymer was recognized to be a homo-polymer of the above-mentioned acrylate.

EXAMPLE 7

(Synthesis of Polymer having Fluorine-containing Ether Structure in its Side Chain)

In a 100 ml four-necked glass flask equipped with a stirrer and a thermometer, 5 g of α-fluoroacrylate:
$CH_2=CFCOOCH_2CF_2CF_2(OCF_2CF_2CF_2)_7OCF_2CF_2CF_3$
having a fluorine-containing ether in its side chain, 0.6 g of methyl methacrylate and 0.9 g of glycidyl methacrylate were dissolved in 20 ml of MIBK solution, and 0.07 g of AIBN was added thereto, followed by sufficiently replacing the inside of the flask with nitrogen and then stirring at 70° C. for eight hours in nitrogen gas stream. The obtained solution was subjected to re-precipitation using hexane as a poor solvent, and a solid was separated and vacuum-dried to obtain 4.5 g of a colorless transparent rubber-like polymer.

According to $^{19}$F-NMR, $^1$H-NMR and IR analyses, this polymer was found to be a polymer comprising α-fluoroacrylate having a fluorine-containing ether in its side chain/methyl methacrylate/glycidyl methacrylate in a molar ratio of 14/45/41. A number average molecular weight thereof measured by GPC analysis using tetrahydrofuran (THF) as a solvent was 72,000.

EXAMPLE 8

(Crosslinking of Fluorine-containing Polymer)

In 100 ml of perfluorohexane was dissolved 20 g of OPTOOL DSX (trade name of DAIKIN INDUSTRIES, LTD.) having methoxysilyl group at its end, and thereto was added 0.5 g of trifluoroacetic acid, followed by casting and then allowing to stand at room temperature. Two days after, a polymer film comprising a rubber-like solid being insoluble in the solvent (perfluorohexane) was obtained. As a result of IR analysis, it was recognized that methoxy groups had almost disappeared and the polymer was found to be a crosslinked polymer.

EXAMPLE 9

(Crosslinking of Fluorine-containing Polyether)

In 20 ml of MIBK were dissolved 10 g of polymer prepared in Example 4, 2 g of ethylenediol diacrylate and 0.1 g of photoradical generator (IRGACURE 907 available from Ciba Specialty Chemicals Co., Ltd.), and a cast film was produced. After evaporation of the solvent, the film was irradiated with ultraviolet light at 1,500 mJ using a UV lamp. After the irradiation, the obtained solid polymer became insoluble in solvents (polar organic solvents such as acetone, MIBK, DMF and NMP). As a result of IR analysis, it was recognized that a carbon-carbon double bond derived from acryl had disappeared and the polymer was a crosslinked polymer.

EXAMPLE 10

(Crosslinking of Fluorine-containing Polymer)

In 20 ml of MIBK were dissolved 10 g of polymer prepared in Example 2, 2 g of diethyleneglycol-2,3-epoxypropyl-2,3-epoxy-2-methylpropylether and 0.1 g of diphenyliodonium trifluoromethanesulfonate as a photo-cation generator, and a cast film was produced. After evaporation of the solvent, the film was irradiated with ultraviolet light at 1,500 mJ using a UV lamp. After the irradiation, further the film was heated at 80° C. for one hour. The obtained solid polymer became insoluble in solvents (same as in Example 9) and the polymer was recognized to be a crosslinked polymer.

EXAMPLE 11

(Synthesis of Polymer having Fluorine-containing Ether Structure in its Side Chain)

In 20 ml of MIBK were dissolved 10 g of polymer prepared in Example 7 and 0.5 g of diphenyliodonium trifluoromethanesulfonate as a photo-cation generator, and a cast film was produced. After evaporation of the solvent, the film was irradiated with ultraviolet light at 1,500 mJ using a UV lamp. After the irradiation, further the film was heated at 80° C. for one hour. The obtained solid polymer became insoluble in solvents (same as in Example 9) and the polymer was recognized to be a crosslinked polymer.

EXAMPLE 12

(Production of Solid Electrolyte)

To 90 parts by weight of acetone solution containing lithium perchlorate in a concentration of 1 mole/liter was added 30 parts by weight of fluorine-containing polymer obtained in Example 1, followed by evaporation of acetone to obtain a rubber-like fluorine-containing polymer solid electrolyte.

Then the both sides of a sample was clipped with nickel blocking electrodes and ion conductivity was measured at 25° C. by an alternating current complex impedance method. As a result, ionic conductivity was $2 \times 10^{-7}$ S/cm.

COMPARATIVE EXAMPLE 1

(Production of Solid Electrolyte)

A polymer solid electrolyte was produced in the same manner as in Example 12 using PEO having a weight average molecular weight of 20,000 and ion conductivity was measured. As a result, ionic conductivity was $8 \times 10^{-8}$ S/cm.

EXAMPLE 13

(Production of Solid Electrolyte)

To 30 parts by weight of propylene carbonate solution containing lithium perchlorate in a concentration of 1 mole/liter was added 30 parts by weight of fluorine-containing polymer obtained in Example 1 to obtain a fluorine-containing polymer solid electrolyte.

Then the both sides of a sample was clipped with nickel blocking electrodes and ion conductivity was measured at 25° C. by an alternating current complex impedance method. As a result, ionic conductivity was $8 \times 10^{-3}$ S/cm.

EXAMPLE 14

(Production of Solid Electrolyte)

In 30 parts by weight of propylene carbonate solution containing lithium perchlorate in a concentration of 1 mole/liter was sufficiently dissolved 7 parts by weight of polyvinylidene fluoride having a weight average molecular weight of about 300,000 at a temperature of about 100° C. A temperature of the obtained solution was decreased to 50° C. and to the solution was added 30 parts by weight of fluorine-containing polymer obtained in Example 1 to obtain a fluorine-containing polymer solid electrolyte.

Then the both sides of a sample was clipped with nickel blocking electrodes and ion conductivity was measured at 25° C. by an alternating current complex impedance method. As a result, ionic conductivity was $2 \times 10^{-4}$ S/cm.

This sample was cut to a specific size and stretched at a low speed of 5 cm/min with a tensile strength tester. A load at which the sample was cut was measured. The load was 6 kgf/cm$^2$.

EXAMPLE 15

(Production of Solid Electrolyte)

In 16 g of propylene carbonate was dissolved 3.5 g of tetraethylammoniumtetrafluoroborate (Et$_4$NBF$_4$). Then 2 g of film obtained in Example 9 was immersed in this solution and allowed to stand at 80° C. for one hour. After that, the film was taken out and subjected to vacuum drying at 100° C. for two hours to obtain a polymer solid electrolyte film.

Then the both sides of this sample film was clipped with nickel blocking electrodes and ion conductivity was measured at 25° C. by an alternating current complex impedance method. Ionic conductivity was $4 \times 10^{-3}$ S/cm. A tensile strength was 5 kgf/cm$^2$.

EXAMPLE 16

(Production of Solid Electrolyte)

In 16 g of acetone was dissolved 3.5 g of tetraethylammoniumtetrafluoroborate (Et$_4$NBF$_4$). Then 2 g of film obtained in Example 9 was immersed in this solution and allowed to stand at 30° C. for one hour. After that, the film was taken out and acetone was evaporated to obtain a polymer solid electrolyte film. Then the both sides of this sample film was clipped with nickel blocking electrodes and ion conductivity was measured at 25° C. by an alternating current complex impedance method. Ionic conductivity was $4 \times 10^{-7}$ S/cm.

EXAMPLE 17

(Production of Solid Electrolyte)

A 1 g film of crosslinked fluorine-containing polyether obtained in Example 10 was immersed in 5 g of pentafluoroethanecarboxylic acid at 25° C. for one hour. After drying at 100° C. for one hour, the solid film was taken out to obtain a polymer solid electrolyte film.

This film was clipped with platinum electrodes, and proton conductivity measured by an alternating current complex impedance method was $2 \times 10^{-2}$ S/cm at 25° C.

EXAMPLE 18

(Production of Solid Electrolyte)

A 1 g fluorine-containing polyether film obtained in Example 8 was immersed in 20 g of acetone containing 1 g of heptafluoropropylsulfonic acid dissolved therein. Acetone was evaporated, and a rubber-like polymer solid electrolyte was obtained. This electrolyte was clipped with platinum electrodes, and proton conductivity measured by an alternating current complex impedance method was $3 \times 10^{-1}$ S/cm at 25° C.

The present invention can provide a solid electrolyte which has an excellent ionic conductivity, is high in oxidation resistance, is stable electrochemically and also thermally and can have sufficient strength. The solid electrolyte is applicable to various electrochemical devices, by making use of those characteristics. Also the fluorine-containing polymer solid electrolyte of the present invention assures easy fabrication, can have a large area and is safe, and therefore is also applicable to large size batteries and capacitors.

What is claimed is:

1. A fluorine-containing polymer solid electrolyte which has an ionic conductivity of from $10^{-10}$ to $10^1$ S/cm measured at 25° C. by an alternating current complex impedance method and comprises:

(A) a non-crystalline fluorine-containing polymer having, in a trunk chain and/or a side chain of the polymer molecule, a structural unit derived from a fluorine-containing ether and represented by the formula (D):

$$-(d1)_{n1}-(d2)_{n2}-(d3)_{n3}-(d4)_{n4}-$$

wherein
   (d1) is $-(OCF_2CF_2CF_2)-$,
   (d2) is $-(OCFX^1CF_2)-$ or $-(OCF_2CFX^1)-$,
   (d3) is $-(OCFX^2)-$,
   (d4) is $-(OCH_2CF_2CF_2)-$ or $-(OCF_2CF_2CH_2)-$;
   n1, n2, n3 and n4 are the same or different and each is 0 or an integer of 1 or more, and n1+n2+n3+n4 is an integer of from 5 to 200; $X^1$ and $X^2$ are the same or different and each is F or $CF_3$, and (B) an electrolytic compound.

2. The fluorine-containing polymer solid electrolyte of claim 1 which further contains (C) an organic solvent and/or water.

3. The fluorine-containing, polymer solid electrolyte of claim 1, wherein the non-crystalline fluorine-containing polymer (A) is represented by the formula (1):

$$(M1)-(M)-(M2) \qquad (1)$$

in which the structural unit M is a fluorine-containing polyether polymer chain segment having:

wherein D is said structural unit D, A is a divalent organic group having 1 to 50 carbon atoms, n6 is 0 or an integer of from 1 to 20; M1 and M2 are the same or different and each is a hydrocarbon group having 1 to 50 carbon atoms which may have ether bond or a fluorine-containing alkyl group having 1 to 50 carbon atoms.

4. The fluorine-containing polymer solid electrolyte of claim 1, wherein the non-crystalline fluorine-containing polymer (A) is represented by the formula (2):

$$(M3)-(M)-(M4) \qquad (2)$$

in which the structural unit M is a fluorine-containing polyether polymer chain segment having:

wherein D is said structural unit D, A is a divalent organic group having 1 to 50 carbon atoms, n6 is 0 or an integer of from 1 to 20; M3 and M4 are the same or different and each is a hydrocarbon group having 1 to 50 carbon atoms which may have ether bond or a fluorine-containing alkyl group having 1 to 50 carbon atoms, and at least one of M3 and M4 has functional group.

5. The fluorine-containing polymer solid electrolyte of claim 4, wherein the functional group contained in M3 and/or M4 of the non-crystalline fluorine-containing polymer (A) represented by the formula (2) is at least one selected from the group consisting of hydroxyl group, carboxylic acid esters, sulfonic acid esters, phosphoric acid esters, carboxylic acid amides, sulfonic acid amides, phosphoric acid amides, carboxylic acid imides, sulfonic acid imides, phosphoric acid imides, carbonates, nitriles, amines, hydroxyl amines, amidines, hydrazines, oximes, carbamates, ureas, imines and amine oxides.

6. The fluorine-containing polymer solid electrolyte of claim 1, wherein the non-crystalline fluorine-containing polymer (A) is a non-crystalline fluorine-containing polymer represented by the formula (3):

$$(M5)-(M)-(M6) \qquad (3)$$

in which the structural unit M is a fluorine-containing polyether polymer chain segment having:

wherein D is said structural unit D, A is a divalent organic group having 1 to 50 carbon atoms, n6 is 0 or an integer of from 1 to 20; M5 and M6 are the same or different and each is a hydrocarbon group having 1 to 50 carbon atoms which may have ether bond or a fluorine-containing alkyl group having 1 to 50 carbon atoms, and at least one of M5 and M6 has crosslinkable functional group.

7. The fluorine-containing polymer solid electrolyte of claim 6, wherein the crosslinkable functional group contained in M5 and/or M6 of the non-crystalline fluorine-containing polymer (A) represented by the formula (3) is at least one selected from the group consisting of hydroxyl group, carboxylic acid, sulfonic acid, epoxy group, oxetane group, alkoxysilyl group, nitrile group, amino group, methacryloyl group, α-fluoroacryloyl group and acryloyl group.

8. The fluorine-containing polymer solid electrolyte of claim 1, wherein the non-crystalline fluorine-containing polymer (A) is a crosslinked polymer of the fluorine-containing polymer of claim 6 having crosslinkable functional group.

9. The fluorine-containing polymer solid electrolyte of claim 1, wherein the non-crystalline fluorine-containing polymer (A) is represented by the formula (4):

$$-(K)-(L)- \qquad (4)$$

in which the structural unit K is a structural unit derived from a fluorine-containing ethylenic monomer and having, in its side chain, a structural unit D1 represented by the formula (D1):

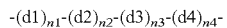

wherein
(d1) is —(OCF$_2$CF$_2$CF$_2$)—,
(d2) is —(OCFX$^1$CF$_2$)— or —(OCF$_2$CFX$^1$)—,
(d3) is —(OCFX$^2$)—,
(d4) is —(OCH$_2$CF$_2$CF$_2$)— or —(OCF$_2$CF$_2$CH$_2$)—;
n1, n2, n3 and n4 are the same or different and each is 0 or an integer of 1 or more, and n1+n2+n3+n4 is an integer of from 5 to 100; X$^1$ and X$^2$ are the same or different and each is F or CF$_3$; the structural unit L is a structural unit derived from a monomer copolymerizable with the monomer providing the structural unit K, and the structural units K and L are contained in amounts of from 0.01 to 100% by mole and from 0 to 99.99% by mole, respectively.

10. The fluorine-containing polymer solid electrolyte of claim 9, wherein the non-crystalline fluorine-containing polymer (A) is represented by the formula (5):

-(K1)-(L1)-  (5)

in which the structural unit K1 is a structural unit derived from a fluorine-containing ethylenic monomer and represented by the formula (K1):

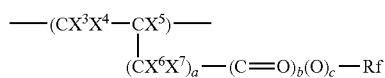

wherein X$^3$ and X$^4$ are the same or different and each is H or F; X$^5$ is H, F, CH$_3$ or CF$_3$; X$^6$ and X$^7$ are the same or different and each is H, F or CF$_3$; Rf is a fluorine-containing organic group having said structural unit D1; a is 0 or an integer of from 1 to 3; b and c are the same or different and each is 0 or 1; the structural unit L1 is a structural unit derived from a monomer copolymerizable with the fluorine-containing ethylenic monomer providing the structural unit K1, and the structural units K1 and L1 are contained in amounts of from 0.01 to 100% by mole and from 0 to 99.99% by mole, respectively.

11. The fluorine-containing polymer solid electrolyte of claim 9, wherein the non-crystalline fluorine-containing polymer (A) is represented by the formula (6):

-(K2)-(L2)-  (6)

in which the structural unit K2 is a structural unit derived from a fluorine-containing ethylenic monomer and represented by the formula (K2):

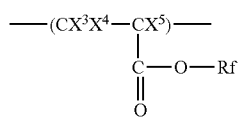

wherein X$^3$ and X$^4$ are the same or different and each is H or F; X$^5$ is H, F, CH$_3$ or CF$_3$; Rf is a fluorine-containing organic group having said structural unit D1; the structural unit L2 is a structural unit derived from a monomer copolymerizable with the fluorine-containing ethylenic monomer providing the structural unit K2, and the structural units K2 and L2 are contained in amounts of from 0.01 to 100% by mole and from 0 to 99.99% by mole, respectively.

12. The fluorine-containing polymer solid electrolyte of claim 9, wherein the non-crystalline fluorine-containing polymer (A) is represented by the formula (7):

-(K3)-(L3)-  (7)

in which the structural unit K3 is a structural unit derived from a fluorine-containing ethylenic monomer and represented by the formula (K3):

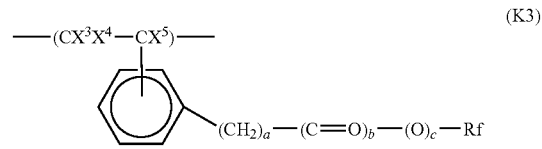

wherein X$^3$ and X$^4$ are the same or different and each is H or F; X$^5$ is H, F, CH$_3$ or CF$_3$; Rf is a fluorine-containing organic group having said structural unit D1; a, b and c are the same or different and each is 0 or 1; the structural unit L3 is a structural unit derived from a monomer copolymerizable with the fluorine-containing ethylenic monomer providing the structural unit K3, and the structural units K3 and L3 are contained in amounts of from 0.01 to 100% by mole and from 0 to 99.99% by mole, respectively.

13. The fluorine-containing polymer solid electrolyte of claim 2, wherein the organic solvent of component (C) is an aprotic organic solvent and is any of carbonates, ethers or esters.

14. The fluorine-containing polymer solid electrolyte of claim 13, wherein the aprotic organic solvent is at least one selected from the group consisting of propylene carbonate, ethylene carbonate, dimethyl carbonate, diethyl carbonate, methyl ethyl carbonate, butylene carbonate, γ-butyrolactone, 3-methyl-2-oxazoline, tetrahydrofuran and triethylene glycol dimethylether.

15. The fluorine-containing polymer solid electrolyte of claim 2, wherein the component (C) is water or alcohol.

16. Electrochemical devices produced by using the fluorine-containing polymer solid electrolyte of claim 1.

17. A battery produced by using the fluorine-containing polymer solid electrolyte of claim 1.

18. A capacitor produced by using the fluorine-containing polymer solid electrolyte of claim 1.

19. A solid display device by produced using the fluorine-containing polymer solid electrolyte of claim 1.

20. A sensor produced by using the fluorine-containing polymer solid electrolyte of claim 1.

* * * * *